United States Patent
Kobayashi et al.

(10) Patent No.: US 8,188,188 B2
(45) Date of Patent: May 29, 2012

(54) PROCESS FOR PRODUCING THERMOPLASTIC RESIN COMPOSITION

(75) Inventors: Sadayuki Kobayashi, Nagoya (JP);
Hideo Matsuoka, Nagoya (JP); Makiko Saito, Nagoya (JP); Masaru Akita, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 12/934,484

(22) PCT Filed: Mar. 25, 2009

(86) PCT No.: PCT/JP2009/055880
§ 371 (c)(1),
(2), (4) Date: Sep. 24, 2010

(87) PCT Pub. No.: WO2009/119624
PCT Pub. Date: Oct. 1, 2009

(65) Prior Publication Data
US 2011/0021707 A1 Jan. 27, 2011

(30) Foreign Application Priority Data

Mar. 27, 2008 (JP) ................ 2008-083460
May 9, 2008 (JP) ................ 2008-123378
Aug. 11, 2008 (JP) ................ 2008-206494

(51) Int. Cl.
*C08F 8/00* (2006.01)
*C08J 3/00* (2006.01)
*C08L 23/00* (2006.01)
(52) U.S. Cl. ............ 525/191; 525/197; 525/240
(58) Field of Classification Search .......... 525/191, 525/197, 240
See application file for complete search history.

(56) References Cited

U.S. PATENT DOCUMENTS

| | | |
|---|---|---|
| 2005/0013192 A1 | 1/2005 | Kakizaki et al. |
| 2007/0211560 A1 | 9/2007 | Takamoto et al. |

FOREIGN PATENT DOCUMENTS

| | | |
|---|---|---|
| EP | 2 017 306 A1 | 1/2009 |
| JP | 7-227836 | 8/1995 |
| JP | 7-237218 | 9/1995 |
| JP | 2000-037764 A | 2/2000 |
| JP | 2003-147625 A | 5/2003 |
| JP | 2005-35212 A | 2/2005 |
| JP | 2005-187809 A | 7/2005 |
| JP | 2006-89701 A | 4/2006 |
| JP | 2006-347151 A | 12/2006 |
| JP | 2007-237679 A | 9/2007 |
| WO | WO 2007/108501 A1 | 9/2007 |

OTHER PUBLICATIONS

International Search Report dated Jun. 16, 2009, issued in PCT/JP2009/055880.
Search Report dated Jan. 31, 2012 for European Application No. 09 72 44 78.

*Primary Examiner* — Nathan M Nutter
(74) *Attorney, Agent, or Firm* — Birch, Stewart, Kolasch & Birch, LLP

(57) ABSTRACT

A thermoplastic resin composition production method wherein melt-kneading is performed in a stretched flow when producing a thermoplastic resin composition as specified in the paragraph (I) or (II) below:
(I) a thermoplastic resin composition comprising a Thermoplastic resin (A) and a Resin (B) with a reactive functional group;
(II) a thermoplastic resin composition comprising a Thermoplastic resin (A), a Thermoplastic resin (C) that is different from the Thermoplastic resin (A), and a Compound (D) with a reactive functional group.

11 Claims, No Drawings even when suffering a heavy, high-speed impact, the large energy is absorbed, causing only a limited maximum load on other adjacent members to avoid their destruction.

PROCESS FOR PRODUCING THERMOPLASTIC RESIN COMPOSITION

TECHNICAL FIELD

The present invention relates to a production method of a thermoplastic resin composition having characteristics (heat resistance, impact resistance, etc., in good balance) unable to be achieved with the conventional production methods wherein the material is stretched in a flow and simultaneously melt-kneaded during reactive processing to produce a thermoplastic resin composition comprising a compound containing a reactive functional group, and it also relates to a production method of a thermoplastic resin composition having peculiar viscoelastic characteristics prominently characterized in that the elastic modulus decreases for an increased flexibility with an increasing deformation speed even in a common-type extruder with a small ratio (L/D) between the screw length (L) and the screw diameter (D) and also having impact absorbing characteristics characterized in that even when suffering a heavy, high-speed impact, the large energy is absorbed, causing only a limited maximum load on other adjacent members to avoid their destruction.

BACKGROUND ART

In reactive processing, the processing equipment for melt-kneading of polymer is also used as reactor. In particular, so-called "reactive extrusion processing," which uses an extruder, has high industrial value-added and therefore, is utilized very actively over the world.

For carrying out reactive processing in an extruder, the extruder has to meet many requirements with respect to temperature control, reaction time (retention time) to be ensured, uniform dispersion of catalysts, and effective removal of by-products. Ensuring a sufficient reaction time (retention time), in particular, is a very important factor in controlling the reaction in the extruder. Thus, extruders with a large ratio (L/D) between the screw length (L) and the screw diameter (D) have been used as a means of ensuring a reaction time (retention time) in the extruder, and for instance, the use of an extruder with a L/D ratio of 50 or more for reactive processing has been disclosed (see Patent document 1).

In addition, a production method using a stretched flow instead of a shear flow, which is commonly used for melt-kneading, has been proposed (see Patent document 2).

Also disclosed is a production process for a resin composition and impact absorbing material wherein their elastic modulus decreases and flexibility increases as the ratio (L/D) between the screw length (L) and the screw diameter (D) of the extruder is increased to raise the reactivity and tension speed (see Patent document 3).

[Patent document 1] Japanese Unexamined Patent Publication (Kokai) No. 2006-347151
[Patent document 2] Japanese Unexamined Patent Publication (Kokai) No. 2006-66025
[Patent document 3] Japanese Unexamined Patent Publication (Kokai) No. 2006-89701

DISCLOSURE OF THE INVENTION

Problems to be Solved by the Invention

Patent document 1 describes that in the production of an alloy of a thermoplastic resin and a resin with a reactive functional group, the use of an extruder with a L/D ratio of 100 serves to increase the reactivity, leading to improvement in the impact resistance and heat resistance. Extruders with a large L/D ratio, however, have difficulty with equipment maintenance and long-term continuous operation, and therefore, development of a simplified production method has been called for.

Patent document 2, on the other hand, describes a newly developed melt-kneading apparatus that utilizes a stretched flow aiming to reduce the screw abrasion, depress the shearing heating during melt-kneading and improve the dispersibility of fillers, though nothing is disclosed or suggested concerning the application of the apparatus to reactive processing.

Furthermore, Patent document 3 proposes the use of an extruder with a L/D ratio of 100 to improve the impact resistance and the impact absorption. Extruders with a large L/D ratio, however, have difficulties with equipment maintenance and long-term continuous operation, and therefore, development of a simplified production method has been called for.

The present invention aims to provide a production method of a thermoplastic resin composition having characteristics (heat resistance, impact resistance, etc., in good balance) unable to be achieved with the conventional production methods wherein the material is stretched in a flow and simultaneously melt-kneaded during reactive processing to produce a thermoplastic resin composition comprising a compound containing a reactive functional group, and it also provides a production method of a thermoplastic resin composition having peculiar viscoelastic characteristics prominently characterized in that the elastic modulus decreases to increase the flexibility with an increasing deformation speed and also having impact absorbing characteristics characterized in that even when suffering a heavy, high-speed impact, the large energy is absorbed, causing only a limited maximum load on other adjacent members to avoid their destruction.

Means of Solving the Problems

As a result of intensive studies to solve the aforementioned problem, the inventors have achieved the present invention after finding that it is possible to produce a thermoplastic resin composition having characteristics (heat resistance, impact resistance, etc., in good balance) unable to be achieved with the conventional production methods wherein the material is stretched in a flow and simultaneously melt-kneaded during reactive processing to produce a thermoplastic resin composition comprising a compound containing a reactive functional group, and it is also possible to produce a thermoplastic resin composition having peculiar viscoelastic characteristics prominently characterized in that the elastic modulus decreases to increase the flexibility with an increasing deformation speed even in a common-type extruder with a small ratio (L/D) between the screw length (L) and the screw diameter (D) and also having impact absorbing characteristics characterized in that even when suffering a heavy, high-speed impact, the large energy is absorbed, causing only a limited maximum load on other adjacent members to avoid their destruction.

Thus, the invention relates to:
(1) a thermoplastic resin composition production method wherein melt-kneading is performed in a stretched flow when producing a thermoplastic resin composition as specified in the paragraph (I) or (II) below:
(I) a thermoplastic resin composition comprising a Thermoplastic resin (A) and a Resin (B) with a reactive functional group;
(II) a thermoplastic resin composition comprising a Thermoplastic resin (A), a Thermoplastic resin (C) that is different from the Thermoplastic resin (A), and a Compound (D) with a reactive functional group;

(2) a thermoplastic resin composition production method as described in the Paragraph (1) above wherein in the thermoplastic resin composition production process, melt-kneading is carried out in an extruder in which the flow effect pressure drop across the zone for performing melt-kneading in a stretched flow (stretched flow zone) is 10 to 1,000 kg/cm$^2$;

(3) a thermoplastic resin composition production method as described in either the Paragraph (1) or (2) above wherein in the thermoplastic resin composition production process, melt-kneading is carried out in an extruder in which the proportion of the total length of the zone for performing melt-kneading in a stretched flow to the total screw length of the extruder is in the range of 5 to 60%;

(4) a thermoplastic resin composition production method as described in the Paragraph (3) above wherein the length Lk of one segment of the zone for performing melt-kneading in a stretched flow (stretched flow zone) and the screw diameter D meet the equation: Lk/D=0.2 to 10;

(5) a thermoplastic resin composition production method as described in any of the Paragraphs (1) to (4) above wherein the Thermoplastic resin (A) is at least one selected from the following: polyamide resin, polyester resin, polyphenylene sulfide resin, polyacetal resin, styrene-based resin, polyphenylene oxide resin, polycarbonate resin, polylactic acid resin, and polypropylene resin;

(6) a thermoplastic resin composition production method as described in any of the Paragraphs (1) to (5) above wherein the Thermoplastic resin (C) is at least one selected from the following and different from the Thermoplastic resin (A): polyamide resin, polyester resin, polyphenylene sulfide resin, polyacetal resin, styrene-based resin, polyphenylene oxide resin, polycarbonate resin, polylactic acid resin, and polypropylene resin;

(7) a thermoplastic resin composition production method as described in any of the Paragraphs (1) to (6) above wherein the Resin (B) with a reactive functional group is a rubber-like polymer with a reactive functional group;

(8) a thermoplastic resin composition production method as described in any of the Paragraphs (1) to (7) above wherein the reactive functional group in the Resin (B) with a reactive functional group is at least one selected from the following: amino group, carboxyl group, carboxyl metal salt, epoxy group, acid anhydride group, and oxazoline group;

(9) a thermoplastic resin composition production method as described in any of the Paragraphs (1) to (8) above wherein the reactive functional group in the Compound (D) with a reactive functional group is at least one selected from the following: amino group, carboxyl group, carboxyl metal salt, epoxy group, acid anhydride group, and oxazoline group;

(10) a thermoplastic resin composition production method as described in any of the Paragraphs (1) to (9) above wherein the Thermoplastic resin (A) is polyamide resin;

(11) a thermoplastic resin composition production method as described in any of the Paragraphs (1) to (10) above wherein the thermoplastic resin composition under tensile test meets the following equation: $E(V1)>E(V2)$ if $V1<V2$, where $E(V1)$ and $E(V2)$ represent the tensile modulus at a tension speed of V1 and V2, respectively;

(12) a thermoplastic resin composition production method as described in any of the Paragraphs (1) to (11) above wherein the thermoplastic resin composition under tensile test meets the following equation: $\epsilon(V1)<\epsilon(V2)$ if $V1<V2$, where $\epsilon(V1)$ and $\epsilon(V2)$ represent the tensile breaking elongation at a tension speed of V1 and V2, respectively;

(13) a thermoplastic resin composition produced with a production method as described in any of the Paragraphs (1) to (9) above;

(14) moldings produced from a thermoplastic resin composition as described in the Paragraph (13); and

(15) moldings as specified in the Paragraph (14) that are in the form of film or sheet.

Effect of the Invention

The present invention makes it possible to produce a thermoplastic resin composition having characteristics (heat resistance, impact resistance, etc., in good balance) unable to be achieved with the conventional production methods wherein the material is stretched in a flow and simultaneously melt-kneaded during reactive processing to produce a thermoplastic resin composition comprising a compound containing a reactive functional group, and also makes it possible to produce a thermoplastic resin composition having peculiar viscoelastic characteristics prominently characterized in that the elastic modulus decreases to increase the flexibility with an increasing deformation speed even in a common-type extruder with a small ratio (L/D) between the screw length (L) and the screw diameter (D) and also having impact absorbing characteristics characterized in that even when suffering a heavy, high-speed impact, the large energy is absorbed, causing only a limited maximum load on other adjacent members to avoid their destruction.

BEST MODE FOR CARRYING OUT THE INVENTION

The invention is described more in detail below.
The thermoplastic resin composition according to the invention is:

(I) a thermoplastic resin composition comprising a Thermoplastic resin (A) and a Resin (B) with a reactive functional group; or (II) a thermoplastic resin composition comprising a Thermoplastic resin (A), a Thermoplastic resin (C) that is different from the Thermoplastic resin (A), and a Compound (D) that has a reactive functional group.

There are no specific limitations on the Thermoplastic resin (A) to be used for the invention if the resin can be molded through heat-melting, and it may be at least one resin selected, for instance, from the following: polyamide resin, polyester resin, polyphenylene sulfide resin, polyacetal resin, polyphenylene oxide resin, polycarbonate resin, polylactic acid resin, polysulfone resin, polytetrafluoroethylene resin, polyetherimide resin, polyamide-imide resin, polyimide resin, polyethersulfone resin, polyether ketone resin, polythioether ketone resin, polyether ether ketone resin, polyethylene resin, polypropylene resin, styrene-based resin such as polystyrene resin and ABS resin, rubber-like polymer, and polyalkylene oxide resin.

Of the aforementioned thermoplastic resins, preferable ones include polyamide resin, polyester resin, polyphenylene sulfide resin, polyacetal resin, styrene-based resin, polyphenylene oxide resin, polycarbonate resin, polylactic acid resin, and polypropylene resin, of which polyamide resin, polyphenylene sulfide resin, polyester resin, and polyphenylene oxide resin are particularly preferable because their end groups are highly reactive. Furthermore, the most preferable one is polyamide.

The polyamide resin used for the invention comprises a polymer containing an amide bond, and it is produced mainly from an amino acid, lactam or diamine, together with a dicarboxylic acid. Typically, such substances include amino acids such as 6-amino caproic acid, 11-aminoundecane acid, 12-aminododecanoic acid, and para-aminomethyl benzoic acid; lactams such as ε-caprolactam, and ω-laurolactam; aliphatic, alicyclic, and aromatic diamines such as tetramethylene diamine, pentamethylene diamine, hexamethylene diamine, 2-methylpentamethylene diamine, nonamethylene diamine, undecamethylene diamine, dodecamethylene diamine, 2,2,4-/2,4,4-trimethylhexamethylene diamine, 5-methylnonamethylene diamine, meta-xylene diamine, para-xylylene diamine, 1,3-bis(aminomethyl)cyclohexane, 1,4-bis(aminomethyl)cyclohexane, 1-amino-3-aminomethyl-3,5,5-trimethyl cyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethyl piperazine; and aliphatic, alicyclic, and aromatic dicarboxylic acids such as adipic acid, suberic acid acid, azelaic acid, sebacic acid, dodecanedioic acid, terephthalic acid, isophthalic acid, 2-chloroterephthalic acid, 2-methylterephthalic acid, 5-methylisophthalic acid, 5-sodium sulfoisophthalic acid, 2,6-naphthalene dicarboxylic acid, hexahydroterephthalic acid, and hexahydroisophthalic acid. In addition, polyamide homopolymers or copolymers derived from these substances may also be used singly or in the form of a mixture.

The polyamide resins particularly useful for the invention are those polyamide resins with a crystal melting point of 150° C. or more that are high in heat resistance and strength, and specifically they include
polycaproamide (polyamide 6), polyhexamethylene adipamide (polyamide 66), polypentamethylene adipamide (polyamide 56), polytetramethylene adipamide (polyamide 46), polyhexamethylene sebacamide (polyamide 610), polypentamethylene sebacamide (polyamide 510), polyhexamethylene dodecamide (polyamide 612), polyundecane amide (polyamide 11), polydodecane amide (polyamide 12), polycaproamide/polyhexamethylene adipamide copolymer (polyamide 6/66), polycaproamide/polyhexamethylene terephthalamide copolymer (polyamide 6/6T), polyhexamethylene adipamide/polyhexamethylene terephthalamide copolymer (polyamide 66/6T), polyhexamethylene adipamide/polyhexamethylene isophthalamide copolymer (polyamide 66/6I), polyhexamethylene adipamide/polyhexamethylene isophthalamide/polycaproamide copolymer (polyamide 66/6I/6), polyhexamethylene terephthalamide/polyhexamethylene isophthalamide copolymer (polyamide 6T/6I), polyhexamethylene terephthalamide/polydecane amide copolymer (polyamide 6T/12), polyhexamethylene adipamide/polyhexamethylene terephthalamide/polyhexamethylene isophthalamide copolymer (polyamide 66/6T/6I), polyxylylene adipamide (polyamide XD6), polyhexamethylene terephthalamide/poly-2-methylpentamethylene terephthalamide copolymer (polyamide 6T/M5T), polyhexamethylene terephthalamide/polypentamethylene terephthalamide copolymer (polyamide 6T/5T), polypentamethylene terephthalamide/polypentamethylene adipamide copolymer (5T/56), polynonamethylene terephthalamide (polyamide 9T), and mixtures and copolymers thereof.

In particular, preferable ones include polyamide 6, polyamide 66, polyamide 56, polyamide 610, polyamide 510, polyamide 612, polyamide 6/66, polyamide 66/6T, polyamide 66/6I/6, and polyamide 6T/5T. Furthermore, it is practically preferred to use these polyamide resins in the form of a mixture to achieve required characteristics such as moldability, heat resistance, toughness, and surface texture. Of these, the most preferable are polyamide 6 and polyamide 66.

There are no specific limitations on the content of end groups in these polyamide resins, but they should preferably have a terminal amino group content of $3 \times 10^{-5}$ mol/g or more because of their high reactive with the Resin (B) with a reactive functional group or the Compound (D) with a reactive functional group. The terminal amino group content referred to here is measured by dissolving a sample in a 85% phenol-ethanol solution, and titrating it with an aqueous hydrochloric acid solution using thymol blue as indicator.

There are no specific limitations on the polymerization degree of these polyamide resins, but their relative viscosity measured at 25° C. in a 98% concentrated sulfuric acid solution with a sample concentration of 0.01 g/ml should preferably be in the range of 1.5 to 5.0, more preferably 2.0 to 4.0.

The polyester resin used in the invention is a thermoplastic resin comprising a polymer having an ester bond in the backbone chain. Typical ones include condensation polymers and copolymers composed mainly of a dicarboxylic acid (or an ester-forming derivative thereof) and a diol (or an ester-forming derivative thereof); and mixtures thereof.

Such dicarboxylic acids include aromatic dicarboxylic acids such as terephthalic acid, isophthalic acid, phthalic acid, 2,6-naphthalene dicarboxylic acid, 1,5-naphthalene dicarboxylic acid, bis(p-carboxyphenyl)methane, anthracene dicarboxylic acid, 4,4'-diphenyl ether dicarboxylic acid, and 5-sodium sulfoisophthalic acid, aliphatic dicarboxylic acids such as adipic acid, sebacic acid, azelaic acid, and dodecanedioic acid; alicyclic dicarboxylic acids such as 1,3-cyclohexanedicarboxylic acid, and 1,4-cyclohexanedicarboxylic acid; ester-forming derivatives thereof. Useful diol components include aliphatic glycols with a carbon number of 2 to 20 such as ethylene glycol, propylene glycol, 1,4-butanediol, neopentyl glycol, 1,5-pentanediol, 1,6-hexanediol, decamethylene glycol, cyclohexanedimethanol, and cyclohexanediol; long chain glycols with a molecular weight of 400 to 6000 such as polyethylene glycol, poly-1,3-propylene glycol, and polytetramethylene glycol; and and ester-forming derivatives thereof.

Preferable examples of these polymers and copolymers include polybutylene terephthalate, polybutylene (terephthalate/isophthalate), polybutylene (terephthalate/adipate), polybutylene (terephthalate/sebacate), polybutylene (terephthalate/decane dicarboxylate), polybutylene naphthalate, polyethylene terephthalate, polyethylene (terephthalate/isophthalate), polyethylene (terephthalate/adipate), polyethylene (terephthalate/5-sodium sulfoisophthalate), polybutylene (terephthalate/5-sodium sulfoisophthalate), polyethylene naphthalate, and polycyclohexane dimethylene terephthalate, of which polybutylene terephthalate, polybutylene (terephthalate/adipate), polybutylene (terephthalate/decane dicarboxylate), polybutylene naphthalate, polyethylene terephthalate, polyethylene (terephthalate/adipate), polyethylene naphthalate, and polycyclohexane dimethylene terephthalate are particularly preferable in terms of the moldability of the polyester compositions. The most preferable is polybutylene terephthalate (polybutylene terephthalate resin).

The polybutylene terephthalate resin should preferably have an intrinsic viscosity, which is measured 25° C. using an o-chlorophenol solvent, in the range of 0.36 to 1.60, more preferably 0.52 to 1.25. It may be used in combination with another polybutylene terephthalate resin with a different intrinsic viscosity. The intrinsic viscosity should preferably be in the range of 0.36 to 1.60.

In terms of the durability and anisotropy reduction effect, furthermore, these polybutylene terephthalate resins should preferably have a COOH end group content, which is measured by potentiometric titration of a m-cresol solution with an alkali solution, in the range of 1 to 50 eq/t (amount of end group per ton of polymer).

Specific examples of the polyphenylene oxide resin used in the invention include poly(2,6-dimethyl-1,4-phenylene oxide), poly(2-methyl-6-ethyl-1,4-phenylene oxide), poly(2,6-diphenyl-1,4-phenylene oxide), poly(2-methyl-6-phenyl-1,4-phenylene oxide), poly(2,6-dichloro-1,4-phenylene oxide), and also included are copolymers such as those composed of 2,6-dimethyl phenol with other phenols (for instance, 2,3,6-trimethyl phenol). In particular, poly(2,6-dimethyl-1,4-phenylene oxide), and copolymers of 2,6-dimethyl phenol and 2,3,6-trimethyl phenol are preferable, of which poly(2,6-dimethyl-1,4-phenylene oxide) is particularly preferable.

The polyphenylene oxide resin should preferably have a reduction viscosity (0.5 g/dl chloroform solution) measured at 30° C. in the range of 0.15 to 0.70.

There are no specific limitations on the production method of such polyphenylene oxide resins, and generally known methods may be used. By using the method proposed by Hay in the specification of U.S. Pat. No. 3,306,874, for instance, such polyphenylene oxide resins can be produced easily through oxidation polymerization using a complex of a cuprous salt and an amine as catalyst. For the invention, it is naturally possible that a polyphenylene oxide resin as produced by the method described above is treated in various ways including modification and activation with a compound containing a functional group such as acid anhydride group, epoxy group, and isocyanate group.

The Resin (B) with a reactive functional group to be used in the invention is a resin that has a reactive functional group in its molecular chain.

There are no specific limitations on the resin to be used as base of the Resin (B) with a reactive functional group of the invention, and it may be at least one selected from the following that is different from the Thermoplastic resin (A): polyamide resin, polyester resin, polyphenylene sulfide resin, polyphenylene oxide resin, polycarbonate resin, polylactic acid resin, polysulfone resin, polyacetal resin, polytetrafluoroethylene resin, polyetherimide resin, polyamide-imide resin, polyimide resin, polyethersulfone resin, polyether ketone resin, polythioether ketone resin, polyether ether ketone resin, polyethylene resin, polypropylene resin, styrene-based resin such as polystyrene resin and ABS resin, rubber-like polymer, and polyalkylene oxide resin.

In particular, polyethylene resin, polypropylene resin, styrene-based resin, and rubber-like polymer are preferable because a reactive functional group can be introduced easily, and rubber-like polymer is particularly preferable in view of the impact resisting characteristics and ductility improving effect.

Such a rubber-like polymer comprises a polymer commonly having a glass transition temperature lower than room temperature wherein part of the molecules are restrained by each other through covalent bond, ionic bond, van der Waals force, entanglement, etc. Preferred ones include, for instance, polybutadiene; polyisoprene; random copolymers and block copolymers of styrene and butadiene; the aforementioned block copolymers that are hydrogenated; diene-type rubbers such as acrylonitrile-butadiene copolymer and butadiene-isoprene copolymer, random copolymers and block copolymers of ethylene and propylene; random copolymers and block copolymers of ethylene and butane; copolymers of ethylene and α-olefin; ethylene-unsaturated carboxylate copolymers such as ethylene-acrylate and ethylene-methacrylate; copolymers of acrylate and butadiene; acrylate-based elastic polymers such as butyl acrylate-butadiene copolymer; copolymers of ethylene and aliphatic vinyl such as ethylene-vinyl acetate copolymer; ethylene-propylene-unconjugated diene terpolymers such as ethylene-propylene-ethylidene norbornene copolymer and ethylene-propylene-hexadiene copolymer; and thermoplastic elastomers such as butylene-isoprene copolymer, chlorinated polyethylene, polyamide elastomer, and polyester elastomer. Of these, if polyamide resin is used as the Thermoplastic resin (A), the use of an ethylene-unsaturated carboxylate copolymer is preferable in view of their compatibility.

The unsaturated carboxylate in the ethylene-unsaturated carboxylate copolymer is an ester of alcohol and a (meth) acrylate, preferably a (meth)acrylic acid. Specific examples of such unsaturated carboxylate include (meth)acrylates such as methyl (meth)acrylate, ethyl (meth)acrylate, 2-ethylhexyl (meth)acrylate, and stearyl (meth)acrylate.

There are no specific limitations on the weight ratio between the ethylene component and the unsaturated carboxylate component in the copolymer, but it should preferably be in the range of 90/10 to 10/90, more preferably 85/15 to 15/85.

There are no specific limitations on the number average molecular weight of the ethylene-unsaturated carboxylate copolymer, but it should preferably be in the range of 1,000 to 70,000 in view of the flowability and mechanical characteristics.

There are no specific limitations on the Thermoplastic resin (C) of the invention if the resin is different from the Thermoplastic resin (A) and can be molded through heat-melting, and it may be at least one selected from the following that is different from the Thermoplastic resin (A): polyamide resin, polyester resin, polyphenylene sulfide resin, polyacetal resin, polyphenylene oxide resin, polycarbonate resin, polylactic acid resin, polysulfone resin, polytetrafluoroethylene resin, polyetherimide resin, polyamide-imide resin, polyimide resin, polyethersulfone resin, polyether ketone resin, polythioether ketone resin, polyether ether ketone resin, polyethylene resin, polypropylene resin, styrene-based resin such as polystyrene resin and ABS resin, rubber-like polymer, and polyalkylene oxide resin.

The Compound (D) with a reactive functional group used in the invention has a reactive functional group in its molecular chain. Such a compound may be either low or high in molecular weight.

There are no specific limitations on the reactive functional group contained in the Resin (B) with a reactive functional group or Compound (D) with a reactive functional group used in the invention if it can react with the functional group contained in the Thermoplastic resin (A) or Thermoplastic resin (C). It may be at least one selected, for instance, from the following: amino group, carboxyl group, carboxyl metal salt, hydroxyl group, acid anhydride group, epoxy group, isocyanate group, mercapto group, oxazoline group, and sulfonic acid group. Of these, amino group, carboxyl group, carboxyl metal salt, epoxy group, anhydride group, and oxazoline group are preferable because they are high in reactivity but largely free of side reactions such as decomposition and crosslinking.

The aforementioned acid anhydride in the acid anhydride group may be, for instance, maleic anhydride, itaconic anhydride, endic anhydride, citraconic anhydride, or 1-butene-3,4-dicarboxylic anhydride. Two or more of these may be simultaneously used in combination. Of these, maleic anhydride and itaconic anhydride are preferably.

There are no specific limitations on the method to introduce an acid anhydride group into a rubber-like polymer, and generally known techniques may be used such as, for instance, copolymerizing an acid anhydride with the monomer for a rubber-like polymer, and grafting an acid anhydride with a rubber-like polymer.

There are no specific limitations on the method to introduce an epoxy group into a rubber-like polymer, and generally known techniques may be used such as, for instance, copolymerizing an epoxy-containing vinyl monomer with the starting monomer for a rubber-like polymer, polymerizing a rubber-like polymer using a polymerization initiator or chain transfer agent containing the aforementioned functional group; or grafting an epoxy compound to a rubber-like polymer.

Such epoxy-containing vinyl monomers include, for instance, glycidyl ester compounds of an α,β-unsaturated acid such as glycidyl acrylate, glycidyl methacrylate, glycidyl ethacrylate, and itaconate glycidyl.

There are no specific limitations on the method to introduce an oxazoline group into a rubber-like polymer, and generally known techniques may be used such as, for instance, copolymerizing a vinyl monomer containing an oxazoline group such as 2-isopropenyl-oxazoline, 2-vinyl-oxazoline, 2-acryloyl-oxazoline, and 2-styryl-oxazoline with the starting monomer for a rubber-like polymer.

There are no specific limitations on the method to introduce a carboxyl group into the base resin for the Resin (B), and generally known techniques may be used such as, for instance, copolymerizing a carboxyl-containing unsaturated carboxylic acid monomer with the starting monomer for the Resin (B). Specifically, such unsaturated carboxylic acids include (meth)acrylic acid. The Resin (B) with a reactive functional group may be, for instance, an ethylene-unsaturated carboxylic acid copolymer such as ethylene-acrylic acid or ethylene-methacrylic acid copolymers.

A carboxyl metal salt produced by replacing part of carboxyl group with a metal salt cal also work effectively as reactive functional group, and examples include, for instance, (meth)acrylic acid metal salts. There are no limitations on the metal component in such metal salts, but preferable ones include alkali metals such as sodium, alkaline earth metals such as magnesium, and zinc. Examples of the Resin (B) with a reactive functional group include ethylene-unsaturated carboxylic acid-unsaturated carboxylic acid metal salt copolymers such as ethylene-acrylic acid-acrylic acid metal salt copolymer and ethylene-methacrylic acid-methacrylic acid metal salt copolymer.

There are no specific limitations on the weight ratio between the unsaturated carboxylic acid component and the unsaturated carboxylic acid metal salt component in such a copolymer, but it is preferably in the range of 95/5 to 5/95, more preferably 90/10 to 10/90.

There are no specific limitations on the number average molecular weight of such an ethylene-unsaturated carboxylate copolymer, but it is preferably in the range of 1,000 to 70,000 in view of the flowability and mechanical characteristics.

For the Resin (B) with a reactive functional group and Compound (D) with a reactive functional group, there are no specific limitations on the number of functional groups per molecular chain, it is preferably 1 to 10 in most cases, more preferably 1 to 5 to decrease side reactions such as crosslinking. Though they may contain molecules completely free of functional groups, their content is preferably as small as possible.

There are no specific limitations on the compounding ratio between the Thermoplastic resin (A) and the Resin (B) with a reactive functional group used for the invention, but the ratio (weight of (A))/(weight of (B)) is preferably in the range of 5/95 to 95/5, more preferably 10/90 to 90/10, and most preferably 15/85 to 85/15.

There are no specific limitations on the compounding ratio between the Thermoplastic resin (A) and the Thermoplastic resin (C) used for the invention, but the ratio (weight of (A))/(weight of (C)) is preferably in the range of 5/95 to 95/5, more preferably 10/90 to 90/10, and still more preferably 15/85 to 85/15.

There are no specific limitations on the content of the Compound (D) with a reactive functional group relative the total weight (100 parts by weight) of the Thermoplastic resin (A) and Thermoplastic resin (C) used for the invention, but it is preferably in the range of 0.1 to 50 parts by weight, more preferably, 0.2 to 40 parts by weight, and still more preferably 0.3 to 30 parts by weight.

In producing the thermoplastic resin composition according to the invention, it is necessary to carry out melt-kneading in a stretched flow. In a stretched flow, molten resin is stretched between two flow components that move in the opposite directions. In a shear flow, which has been used commonly, on the other hand, molten resin is deformed between two flow components that move in the same directions at different speeds.

In a stretched flow, dispersion efficiency during melt-kneading is higher than in a common shear flow, making it possible to allow the reaction to progress efficiently, particularly in such cases as reactive processing that involves chemical reactions for alloy production.

A preferable method to carry out such melt-kneading in a stretched flow is the use of an extruder, and useful extruders include single screw extruders, twin screw extruders, and triple and multiple screw extruders, of which single screw extruders and twin screw extruders are used preferably. Of these, twin screw extruders are used particularly preferably. There are no specific limitations on the type of screw in these twin screw extruders, but preferable ones include fully intermeshing, incomplete intermeshing, and intermeshing twin screw extruders, of which the fully intermeshing type is preferably in view of the kneading performance and reaction efficiency. With respect to the direction of screw rotation, either co-rotating or counter-rotating type extruders may be used, but co-rotating type extruders are preferable in view of the kneading performance and reaction efficiency. The most preferable for the invention is extruders with co-rotating fully intermeshing screws. When carrying out melt-kneading for the invention by using an extruder, the flow effect pressure drop across the zone for performing melt-kneading in a stretched flow (stretched flow zone) is preferably 10 to 1000 kg/cm$^2$. The flow effect pressure drop across the zone for performing melt-kneading in a stretched flow (stretched flow zone) is calculated by subtracting the pressure difference ($\Delta P_0$) in the stretched flow zone from the pressure difference ($\Delta P$) at the front end of the stretched flow zone. If the flow effect pressure drop across the stretched flow zone is less than 10 kg/cm$^2$, it will be difficult for a stretched flow to develop in the stretched flow zone, and the pressure distribution will become nonuniform, which is unpreferable. If the flow effect pressure drop across the stretched flow zone is larger than 1,000 kg/cm$^2$, the back pressure in the extruder will be excessively high and it will be difficult to perform stable production, which is unpreferable. The flow effect pressure drop across the zone for performing melt-kneading in a stretched flow (stretched flow zone) is preferably in the range of 30 to 600 kg/cm$^2$, more preferably 50 to 600 kg/cm$^2$, and most preferably 100 to 500 kg/cm$^2$.

When carrying out melt-kneading for the invention by using an extruder, the proportion of the total length of the zone for performing melt-kneading in a stretched flow (stretched flow zone) to the overall screw length of the extruder is preferably in the range of 5 to 60%, more preferably 10 to 55%, and still more preferably 15 to 50%, in order to create a stretched flow field suitable for reactive processing.

When carrying out melt-kneading for the invention by using an extruder, furthermore, the length Lk of one segment of the zone for performing melt-kneading in a stretched flow (stretched flow zone) and the screw diameter D meet the equation Lk/D=0.2 to 10 in view of the kneading performance and reaction efficiency. It is more preferably 0.3 to 9, still more preferably 0.5 to 8. For the invention, the zone for performing melt-kneading in a stretched flow (stretched flow zone) in a twin screw extruder should preferably be provided over the entire length of the screw instead of being unevenly distributed in particular portions in the screw. In particular, the zone for performing melt-kneading in a stretched flow (stretched flow zone) should preferably be divided into three segments that are provided in different portions of the screw in the extruder in view of the kneading performance and reaction efficiency.

When carrying out melt-kneading for the invention by using an extruder, the zone for performing melt-kneading in a stretched flow should preferably be designed, for instance, so that it comprises a kneading disk in the form of a twist kneading disk with the spiral angle θ between the apex of the disk front end of the kneading disk and the apex of its rear end is in the range of 0°<θ<90° in the caracole direction of the screw, or so that it comprises a flighted screw having a flight portion in which a resin passage with its cross section decreasing from the screw's front end toward the rear end is provided, or so that the extruder contains a resin passage that serves to pass the molten resin and has a cross section that decreases tentatively.

When carrying out melt-kneading for the invention by using an extruder, furthermore, the extrusion output of the thermoplastic resin composition per 1 rpm of the screw is preferably 0.01 kg/h or more. Said extrusion output means the extrusion speed of the thermoplastic resin composition discharged from the extruder and it is equivalent to the weight (kg) of the composition extruded per hour. If the extrusion output of the thermoplastic resin composition per 1 rpm of the screw is less than 0.01 kg/h, the extrusion output will not be sufficiently high compared with the rotation speed, and the retention time in the extruder will become too long, leading to heat degradation. In addition, the filling factor of the resin in the extruder will be too small, which can lead to a problem associated with insufficient kneading. There are no specific limitations on the rotating speed of the screw if it is in the aforementioned range, but it is commonly 10 rpm or more, preferably 50 rpm or more, and more preferably 80 rpm or more. There are no specific limitations on the extrusion output if it is in the aforementioned range, but it is commonly 0.1 kg/h or more, preferably 0.15 kg/h or more, and more preferably 0.2 kg/h or more.

When carrying out melt-kneading for the invention by using an extruder, the retention time of the thermoplastic resin composition in the extruder is preferably 0.1 to 20 min. To determine said retention time, a coloring agent etc. is supplied together with the raw material at the root position of the screw, followed by measuring the time period starting when the coloring agent etc. is supplied and ending when the degree of coloring of the extruded material caused by the coloring agent reaches a maximum after the thermoplastic resin composition has been extruded from the discharge port of the extruder. If the retention time is less than 0.1 min, the reaction time in the extruder will so short that the reaction will not be promoted sufficiently, probably failing to improve the characteristics (heat resistance, impact resistance, etc., in good balance) of the thermoplastic resin composition or improve the impact absorbing characteristics associated with significantly developed peculiar viscoelasticity characteristics. If the retention time is longer than 20 min, problems such as heat degradation of the resin can take place as a result of an increase in the retention time. For the invention, the retention time is preferably 0.3 to 15 min, more preferably 0.5 to 5 min.

The thermoplastic resin composition provided by the invention has non-viscoelastic characteristics characterized in that it becomes more flexible as it is deformed more quickly. Even when suffering a heavy, high-speed impact, the large energy is absorbed, causing only a limited maximum load on other adjacent members to avoid their destruction.

When subjected to tensile test, the thermoplastic resin composition produced according to the invention preferably meets the following equation: $E(V1)>E(V2)$ if $V1<V2$, where $E(V1)$ and $E(V2)$ represent the tensile modulus at a tension speed of V1 and V2, respectively. The tensile test referred to above is carried out according to a method specified in the applicable standard. The tensile modulus is defined as the gradient of the initial straight line portion of the stress-strain curve.

When subjected to tensile test, the thermoplastic resin composition produced according to the invention preferably meets the following equation: $\epsilon(V1)>\epsilon(V2)$ if $V1<V2$, where $\epsilon(V1)$ and $\epsilon(V2)$ represent the tensile breaking elongation at a tension speed of V1 and V2, respectively. The aforementioned equation preferably holds for any V1 and V2 when the tension speed is in the range of 10 mm/min or more and 500 mm/min or less, more preferably holds for any V1 and V2 when the tension speed is in the range of 1 mm/min or more and 1,000 mm/min or less.

The thermoplastic resin composition produced according to the invention may contain, as needed, a resin that can serve as the base resin for the Resin (B) with a different reactive functional group, unless it impairs the characteristics. Two or more such resins that can serve as the base resin for the Resin (B) with a different reactive functional group may be used in combination. There are no specific limitations on their content, but it is preferably 1 to 400 parts by weight relative to 100 parts by weight of the thermoplastic resin composition.

For the invention, other components may be added as needed. As such other component, a filler may be added as needed in order, for instance, to improve the strength, dimensional stability, etc. These fillers may be fibrous or nonfibrous ones, or combinations of fibrous or nonfibrous ones. Such fillers include fibrous fillers such as glass fiber, glass milled fiber, carbon fiber, potassium titanate whisker, zinc oxide whisker, aluminum borate whisker, aramid fiber, alumina fiber, silicon carbide fiber, ceramic fiber, asbestos fiber, gypsum fiber, and metal fiber; silicates such as walastenite, zeolite, sericite, kaolin, mica, clay, pyrophyllite, bentonite, asbestos, talc, and alumina silicate; metal compounds such as alumina, silicon oxide, magnesium oxide, zirconium oxide, titanium oxide, and iron oxide; carbonates such as calcium carbonate, magnesium carbonate, and dolomite; sulfates such as calcium sulfate and barium sulfate; hydroxides such as magnesium hydroxide, calcium hydroxide, and aluminum hydroxide; and nonfibrous fillers such as glass beads, ceramic beads, boron nitride, and silicon carbide, which may be in a hollow form, and two or more of these fillers may be used in combination. These fibrous and/or nonfibrous fillers may be pre-treated with a coupling agent such as isocyanate compound, organic silane compound, organic titanate compound, organic borane compound, or epoxy compound, to achieve a higher mechanical strength.

If such fillers are used to improve the strength, dimensional stability, etc., there are no specific limitations on their content, but it is commonly 0.1 to 400 parts by weight relative to the 100 parts by weight of the thermoplastic resin composition.

Furthermore, the thermoplastic resin composition produced according to the invention may contain other thermoplastic resins, rubbers, or various additives, as needed, unless they impair the characteristics.

Such rubbers include, for instance, polybutadiene; polyisoprene; random copolymers and block copolymers of styrene and butadiene; the aforementioned block copolymers that are hydrogenated; diene-type rubbers such as acrylonitrile-butadiene copolymer and butadiene-isoprene copolymer, random copolymers and block copolymers of ethylene and propylene; random copolymers and block copolymers of ethylene and butane; copolymers of ethylene and α-olefin; ethylene-unsaturated carboxylic acid copolymers such as ethylene-acrylic acid and ethylene-methacrylic acid; ethylene-unsaturated carboxylate copolymers such as ethylene-acrylate and ethylene-methacrylate; ethylene-unsaturated carboxylic acid-unsaturated carboxylic acid metal salt copolymers in which part of the unsaturated carboxylic acid is replaced with a metal salt, such as ethylene-acrylic acid-acrylic acid metal salt and ethylene-methacrylic acid-methacrylic acid metal salt; copolymers of acrylate and butadiene; acrylate-based elastic polymers such as butyl acrylate-butadiene copolymer; copolymers of ethylene and aliphatic vinyl such as ethylene-vinyl acetate copolymer; ethylene-propylene-unconjugated diene terpolymers such as ethylene-propylene-ethylidene norbornene copolymer and ethylene-propylene-hexadiene copolymer; and thermoplastic elastomers such as butylene-isoprene copolymer, chlorinated polyethylene, polyamide elastomer, and polyester elastomer. Two or more of these rubbers may be used in combination. When these rubbers are used, there are no specific limitations on their content, but it is commonly 1 to 400 parts by weight relative to 100 parts by weight of the thermoplastic resin composition.

Such various preferable additives include crystal nucleating agents; color protection agents; antioxidants and thermal stabilizers such as hindered phenol, hindered amine, hydroquinone, phosphate, substitutes thereof, halogenated copper, and iodide compound; weathering agents such as resorcinol, salicylate, benzotriazole, benzophenone, and hindered amine; mold releasing agents such as aliphatic alcohol, aliphatic amide, aliphatic bisamide, ethylene bis-stearamide, and higher fatty acid ester; plasticizers such as octyl p-oxybenzoate and N-butyl benzene sulfone amide; lubricants; coloring dyes such as nigrosine and aniline black; coloring pigments such as cadmium sulfide, phthalocyanine, and carbon black; anionic electrification prevention agents such as alkyl sulfate; cationic electrification prevention agents such as quaternary ammonium salts; nonionic electrification prevention agents such as polyoxyethylene sorbitan monostearate; amphoteric electrification prevention agents such as betaine; flame retardants such as melamine cyanurate, magnesium hydroxide, aluminum hydroxide, other similar hydroxides, ammonium polyphosphate, brominated polystyrene, brominated polyphenylene oxide, brominated polycarbonate, brominated epoxy resin, combinations of these flame retardants with antimony trioxide; and foaming agents.

Preferable antioxidants include hindered phenolic compounds and phosphorous compounds. Preferable hindered phenolic compounds include triethylene glycol-bis[3-t-butyl-(5-methyl-4-hydroxy phenyl)propionate], N,N'-hexamethylene bis(3,5-di-t-butyl-4-hydroxy-hydrocinnamide), tetrakis [methylene-3-(3',5'-di-t-butyl-4'-hydroxy phenyl)propionate]methane, pentaerythrityl tetrakis [3-(3',5'-di-t-butyl-4'-hydroxy phenyl) propionate], 1,3,5-tris-(3,5-di-t-butyl-4-hydroxy benzyl)-s-triazine-2,4,6-(1H,3H,5H)-trione, 1,1,3-tris-(2-methyl-4-hydroxy-5-t-butyl phenyl) butane, 4,4'-butylidene bis(3-methyl-6-t-butyl phenol), n-octadecyl-3-(3,5-di-t-butyl-4-hydroxy-phenyl)propionate, 3,9-bis[2-(3-(3-t-butyl-4-hydroxy-5-methyl phenyl)propionyl oxy)-1,1-dimethylethyl]-2,4,8,10-tetraoxaspiro[5,5]undecane, 1,3,5-trimethyl-2,4,6-tris-(3,5-di-t-butyl-4-hydroxy benzyl)benzene.

In particular, ester-type high-molecular hindered phenols are preferable. Specifically, they include tetrakis [methylene-3-(3',5'-di-t-butyl-4'-hydroxy phenyl)propionate]methane, pentaerythrityl tetrakis [3-(3',5'-di-t-butyl-4'-hydroxy phenyl)propionate], 3,9-bis[2-(3-(3-t-butyl-4-hydroxy-5-methyl phenyl)propionyl oxy)-1,1-dimethylethyl]-2,4,8,10-tetraoxaspiro[5,5]undecane.

Specifice examples of such phosphorous compound based antioxidants include bis(2,6-di-t-butyl-4-methyl phenyl)pentaerythritol-di-phosphite, bis(2,4-di-t-butyl phenyl)pentaerythritol-di-phosphite, bis(2,4-di-cumyl phenyl)pentaerythritol-di-phosphite, tris-(2,4-di-t-butyl phenyl) phosphite, tetrakis (2,4-di-t-butyl phenyl)-4,4'-bis-phenylene phosphite, di-stearyl pentaerythritol-di-phosphite, triphenyl phosphite, and 3,5-di-butyl-4-hydroxy benzyl phosphonate diethyl ester. It is possible to use two or more of these antioxidants in combination. When using these antioxidants, there are no specific limitations on their content, but it is preferably 0.01 to 20 parts by weight relative to 100 parts by weight of the thermoplastic resin composition.

These thermoplastic resins, rubbers, and various additives may be added at any desired stage of the production process for the thermoplastic resin composition of the invention. When combining two resin components, for instance, such additives etc. may be fed simultaneously with the two resin components, fed through a side feeding port etc. during the melt-kneading of the two resin components, fed to one of the resin components first, followed by melt-kneading and supply of the other resin component.

The thermoplastic resin composition produced according to the invention can be molded with any appropriate method into any appropriate shape. Useful molding methods include, for instance, extrusion molding, injection molding, hollow molding, calender molding, compression molding, vacuum molding, and foamed molding. The moldings may be in the form of pellet, plate, film, sheet, pipe, hollow, or box.

The thermoplastic resin composition produced according to the invention may be molded into various products including electronic parts such as connector, coil, sensor, LED lamp, socket, resistance, relay case, small switch, coil bobbin, capacitor, variable capacitor case, optical pickup, oscillator, various terminal plates, transformer, plug, print base plate, tuner, speaker, microphone, headphone, small motor, magnetic head base, power module, semiconductor, liquid crystal, FDD carriage, FDD chassis, motor brush holder, parabolic antenna, and computer related parts; electric equipment parts such as power generator, electric motor, potential transformer, current transformer, voltage regulator, rectifier, inverter, relay, electric power contact, switch, shutoff, knife switch, multipolar rod, electric part, and cabinet; parts of domestic and office appliances such as VTR parts, TV parts, iron, hair drier, rice cooker parts, microwave oven parts, sound equipment parts, audio equipment parts, audio disc, laser disc (registered trademark), compact disc, DVD, other audio-visual equipment parts, lighting fixture parts, refrigerator parts, air conditioner parts, typewriter parts, and word processor parts; machine related parts such as office computer related parts, telephone related parts, facsimile related parts, copier related parts, washing jig, motor parts, lighter, and typewriter; parts of optical equipment and precision machinery such as microscope, binocular, camera, and clock; and automobile and vehicle parts such as alternator terminal, alternator connector, IC regulator, dimmer potentiometer base, exhaust gas valve, other various valves, fuel-, cooling-, brake-, wiper-, exhaust-, and suction-related various pipes/hoses/tubes, air intake nozzle snorkel, intake manifold, fuel pump, engine cooling water joint, carburetor main body, carburetor spacer, exhaust gas sensor, cooling water sensor, oil temperature sensor, brake pad wear sensor, throttle position sensor, crank shaft position sensor, air flow meter, brake pad abrasion sensor, air conditioner thermostat base, heater's warm air flow control valve, radiator motor brush holder, water pump impeller, turbine vane, wiper motor related parts, distributor, starter switch, starter relay, transmission wire harness, wind washer nozzle, air conditioner panel switch circuit board, fuel related electromagnetic valve coil, wire harness connector, SMJ connector, PCB connector, door grommet connector, fuse connector, other various connectors, horn terminal, electrical equipment parts insulation plate, step motor rotor, lamp socket, lamp reflector, lamp houses, brake piston, solenoid bobbin, engine oil filter, ignition equipment case, torque control lever, safety belt parts, register blade, washer lever, wind regulator handle, wind regulator handle knob, passing light lever, sun visor bracket, instrument panel, air bag peripheral parts, door pad, pillar, console box, various motor houses, roof rail, fender, garnish, bumper, door panel, roof panel, hood panel, trunk lid, door mirror stay, spoiler, hood louver, wheel cover, wheel cap, grill apron cover frame, lamp bezel, door handle, door molding, rear finisher, and wiper.

Furthermore, the thermoplastic resin composition produced according to the invention serves also as preferable material for producing film and sheets such as for soft members for automobile interior finishing, packaging film, and desk mat.

EXAMPLES

The present invention will now be illustrated in greater detail with reference to Examples. The following products were used as starting materials unless otherwise specified.

A-1: polyamide resin (polyamide 6) CM1017 (supplied by Toray Industries, Inc.)
A-2: polyamide 6 resin with a melting point of 225° C., relative viscosity at 0.01 g/ml in 98% sulfuric acid of 2.35
A-3: polyamide resin (polyamide 66) CM3001N (supplied by Toray Industries, Inc.)
A-4: polyamide 56 resin produced in Reference example 1 given below
A-5: polyamide 6T/66 resin produced in Reference example 2 given below
A-6: polyamide 66/6I/6 resin produced in Reference example 3 given below
A-7: polybutylene terephthalate resin 1401 (supplied by Toray Industries, Inc.)
A-8: polyphenylene sulfide resin A900 (supplied by Toray Industries, Inc.)
A-9: polyethylene terephthalate resin SA-135 (supplied by Mitsui Chemicals, Inc.)
A-10: aromatic polycarbonate resin Tuflon A2500 (supplied by Idemitsu Kosan Co., Ltd.)
A-11: polyLlactic acid resin with a melting point of 170° C., weight average molecular weight of 210,000 (gel permeation chromatography, 1,1,1,3,3,3-hexafluoro-2-propanol eluant, in terms of PMMA), D-form content of 1.2%
A-12: polyphenylene ether resin PX-100F (supplied by Mitsubishi Engineering-Plastics Corporation)
A-13: polypropylene resin with a moisture content of 100 ppm produced by dry-blending 100 parts by weight of polypropylene resin with a melting point of 160° C., MFR of 0.5 g/10 min (230° C., 2.16 kg load), and density of 0.910 g/cm$^3$, 1 parts by weight of maleic acid anhydride, and 0.1 part by weight of a radical generation agent (Perhexa 25B: supplied by NOF Corporation), followed by melt-kneading at a cylinder temperature of 230° C.
B-1: glycidylmethacrylate-modified polyethylene copolymer Bondfast BF-7L (supplied by Sumitomo Chemical Co., Ltd.)
B-2: glycidylmethacrylate-modified polyethylene copolymer Bondfast BF-7M (supplied by Sumitomo Chemical Co., Ltd.)
B-3: glycidylmethacrylate-modified polyethylene copolymer Bondfast BF-E (supplied by Sumitomo Chemical Co., Ltd.)
B-4: maleic anhydride-modified ethylene-1-butene copolymer Tafmer MH7020 (supplied by Mitsui Chemicals, Inc.)
B-5: ethylene-methacrylic acid-methacrylic acid zinc salt copolymer Himilan 1706 (supplied by DuPont-Mitsui Polychemicals Co., Ltd.)
C-1: ethylene/1-butene copolymer Tafmer TX-610 (supplied by Mitsui Chemicals, Inc.)
C-2: unmodified polyethylene copolymer Lotryl 29MA03 (supplied by Arkema K.K.)
C-3: polyphenylene ether resin PX-100F (supplied by Mitsubishi Engineering-Plastics Corporation)
D-1: styrene-maleic acid anhydride copolymer Dylark 332J (supplied by NOVA Chemicals Inc.)
E-1: heat resistant agent IR1098 (supplied by Ciba Specialty Chemicals)
E-2: heat resistant agent IR1010 (supplied by Ciba Specialty Chemicals)
E-3: mold releasing agent Licowax OP (supplied by Clariant Japan K.K.).

Reference Example 1

A 50 wt % aqueous solution of an equimolar salt (56 salt) of 1,5-diaminopentane and adipic acid containing 14-fold mol/kmol salt of 1,5-diaminopentane was fed to a polymerization vessel, and after sufficiently replacing the air in the polymerization vessel with nitrogen, heating was started under stirring. After the pressure in the vessel had reached 17.5 kg/cm$^2$, the pressure in the vessel was maintained constant at 17.5 kg/cm$^2$ while releasing moisture out of the equipment. After maintaining this state for two hours, the pressure was lowered gradually for one hour down to atmospheric pressure, and the temperature was raised up to 270° C. The reaction was continued for 30 minutes at 270° C. under a reduced pressure of −160 mmHg to complete the polymerization. Then the polymer was discharged into a water bath, and pelletized with a strand cutter to provide a polyamide resin (A-4). The polyamide resin obtained had a relative solution viscosity of 2.76 as measured at 25° C. at a concentration of 0.01 g/ml in 98% concentrated sulfuric acid, amino end group content of $8.12 \times 10^{-5}$ eq/g, and a carboxyl end group content of $5.21 \times 10^{-5}$ eq/g. Its Tm was 254° C. as measured with a differential scanning calorimeter.

Reference Example 2

First, 45 wt % of the equimolar salt (6T salt) of terephthalic acid and hexamethylene diamine, 55 wt % of the equimolar salt (66 salt, supplied by Rhodia) of hexamethylene diamine and adipic acid, and a 10-fold mol/kmol salt of benzoic acid (supplied by Sigma-Aldrich Japan K.K.) were fed in a polymerization vessel, and then water was added up to a content of 30 wt % relative to the total material amount. After sufficiently replacing the air in the polymerization vessel with nitrogen, heating was started under stirring. After the pressure in the vessel had reached 25 kg/cm², the pressure in the vessel was maintained constant at 25 kg/cm² at 240° C. for two hours while releasing moisture out of the equipment, followed by discharging the material onto a cooling belt. The material was then vacuum-dried at 120° C. for 24 hours to produce a low-degree condensation product, followed by solid phase polymerization of the low-degree condensation product at 240° C. under 0.3 torr for three hours to provide a polyamide resin (A-5). The polyamide resin obtained had a relative solution viscosity of 2.6 as measured at 25° C. at a concentration of 0.01 g/ml in 98% concentrated sulfuric acid. Its Tm was 290° C. as measured with a differential scanning calorimeter.

Reference Example 3

First, 75 wt % of the equimolar salt (66 salt) of hexamethylene diamine and adipic acid, 20 wt % of the equimolar salt (61 salt) of hexamethylene diamine and isophthalic acid, and 5 wt % of ε-caprolactam were fed in a polymerization vessel, and then water was added up to a content of 50 wt % relative to the total material amount. After sufficiently replacing the air in the polymerization vessel with nitrogen, heating was started under stirring. After the pressure in the vessel had reached 20 kg/cm², the pressure in the vessel was maintained constant at 20 kg/cm² while releasing moisture out of the equipment. After maintaining this state for two hours, the pressure was lowered gradually for one hour down to atmospheric pressure, and the temperature was raised up to 270° C. The reaction was continued for 10 minutes at 270° C. under a reduced pressure of −160 mmHg to complete the polymerization. Then the polymer was discharged into a water bath, and pelletized with a strand cutter to provide a polyamide resin (A-6). The polyamide obtained had a relative solution viscosity of 2.03 as measured at 25° C. at a concentration of 0.01 g/ml in 98 wt % concentrated sulfuric acid. Its melting point was 233° C. as measured with a differential scanning calorimeter.

Example 1

A polyamide 6 product (A-1: CM1017, supplied by Toray Industries, Inc.) used as Thermoplastic resin (A) and a glycidyl methacrylate-modified polyethylene copolymer (B-1) used as Resin (B) with a reactive functional group were mixed at a compounding ratio as shown in Table 1. While removing volatile matter with a vacuum pump and supplying a nitrogen flow, the mixture was melt-kneaded in a co-rotating, fully intermeshing twin screw extruder with a screw diameter of 30 mm and a L/D ratio of 45 (TEX-30α with two double-thread screws, supplied by The Japan Steel Works, Ltd.) at a cylinder temperature of 260° C. and at a screw rotation rate and extrusion output as shown in Table 1, and discharged from the discharge port. A coloring agent was added to the starting materials and the time at which the degree of coloring of the extrudate reached a maximum was measured to determine the retention time as shown in Table 1. The proportion (%) of the total length of the zone for performing melt-kneading in a stretched flow (stretched flow zone) to the overall length of the screws, defined as (total length of stretched flow zone)/ (overall length of screws)×100, was adjusted to 29%. The extruder had a twist kneading disk comprising screws with Lk/D ratios of 4.0, 4.0, and 5.0 from the positions at which the L/D ratio was 14, 23, and 30, respectively, and the spiral angle θ between the apex of the disk front end of the kneading disk and the apex of its rear end was 20° in the caracole direction of the screws (referred to as Screw constitution A-1). The flow effect pressure drop across the stretched flow zone, which is calculated by subtracting the pressure difference ($\Delta P_0$) in the stretched flow zone from the pressure difference ($\Delta P$) at the front side of the twist kneading disk, was 200 kg/cm².

Example 2

Except that the extruder used had a twist kneading disk comprising screws with Lk/D ratios of 4.0, 2.0, 2.0, and 1.0 from the positions at which the L/D ratio was 14, 23, 30, and 35, respectively, and the spiral angle θ between the apex of the front end of the kneading disk and the apex of its rear end was 20° in the caracole direction of the screws (referred to as Screw constitution A-2) and that the proportion (%) of the total length of the zone for performing melt-kneading in a stretched flow (stretched flow zone) to the overall length of the screws adjusted to 20%, the same melt-kneading procedure as in Example 1 was carried out. The flow effect pressure drop across the stretched flow zone, which is calculated by subtracting the pressure difference ($\Delta P_0$) in the stretched flow zone from the pressure difference ($\Delta P$) at the front side of the twist kneading disk, was 180 kg/cm².

Example 3

A polyamide 6 product (A-1: CM1017, supplied by Toray Industries, Inc.) used as Thermoplastic resin (A) and a glycidyl methacrylate-modified polyethylene copolymer used as Resin (B) with a reactive functional group were mixed at a compounding ratio as shown in Table 1. While removing volatile matter with a vacuum pump and supplying a nitrogen flow, the mixture was melt-kneaded in a co-rotating, fully intermeshing twin screw extruder with a screw diameter of 30 mm and a L/D ratio of 35 (TEX-30α with two double-thread screws, supplied by The Japan Steel Works, Ltd.) at a cylinder temperature of 260° C. and at a screw rotation rate and extrusion output as shown in Table 1, and discharged from the discharge port. A coloring agent was added to the starting materials and the time at which the degree of coloring of the extrudate reached a maximum was measured to determine the retention time as shown in Table 1. The proportion (%) of the total length of the zone for performing melt-kneading in a stretched flow (stretched flow zone) to the overall length of the screws, defined as (total length of stretched flow zone)/ (overall length of screws)×100, was adjusted to 31%. The extruder had a twist kneading disk comprising screws with Lk/D ratios of 3.0, 4.0, and 4.0 from the positions at which the L/D ratio was 12, 17, and 22, respectively, and the spiral angle θ between the apex of the front end of the kneading disk and the apex of its rear end was 20° in the caracole direction of the screws (referred to as Screw constitution B-1). The flow effect pressure drop across the stretched flow zone, which is calculated by subtracting the pressure difference ($\Delta P_0$) in the stretched flow zone from the pressure difference ($\Delta P$) at the front side of the twist kneading disk, was 150 kg/cm$^2$.

Example 4

Except that the extruder used had a twist kneading disk comprising screws with Lk/D ratios of 3.0, 2.0, 2.0, and 1.0 from the positions at which the L/D ratio was 12, 17, 21, and 25, respectively, and the spiral angle θ between the apex of the front end of the kneading disk and the apex of its rear end was 20° in the caracole direction of the screws (referred to as Screw constitution B-2) and that the proportion (%) of the total length of the zone for performing melt-kneading in a stretched flow (stretched flow zone) to the overall length of the screws adjusted to 23%, the same melt-kneading procedure as in Example 3 was carried out. The flow effect pressure drop across the stretched flow zone, which is calculated by subtracting the pressure difference ($\Delta P_0$) in the stretched flow zone from the pressure difference ($\Delta P$) at the front side of the twist kneading disk, was 120 kg/cm$^2$.

Examples 5 to 9

Except that the Thermoplastic resin (A) and the Resin (B) with a reactive functional group as shown in Table 2 was used, the same melt-kneading procedure as in Example 1 was carried out. The flow effect pressure drop across the stretched flow zone, which is calculated by subtracting the pressure difference ($\Delta P_0$) in the stretched flow zone from the pressure difference ($\Delta P$) at the front side of the twist kneading disk, was 200 kg/cm$^2$.

Examples 10 to 13

Except that the Thermoplastic resin (A) and the Resin (B) with a reactive functional group as shown in Table 3 was used, the same melt-kneading procedure as in Example 1 was carried out. The flow effect pressure drop across the stretched flow zone, which is calculated by subtracting the pressure difference ($\Delta P_0$) in the stretched flow zone from the pressure difference ($\Delta P$) at the front side of the twist kneading disk, was 200 kg/cm$^2$.

Examples 14 to 17

Except that the Thermoplastic resin (A) and the Resin (B) with a reactive functional group as shown in Table 4 was used, and that the cylinder temperature was adjusted to 280° C., the same melt-kneading procedure as in Example 1 was carried out. The flow effect pressure drop across the stretched flow zone, which is calculated by subtracting the pressure difference ($\Delta P_0$) in the stretched flow zone from the pressure difference ($\Delta P$) at the front side of the twist kneading disk, was 200 kg/cm$^2$.

Example 18

Except that the Thermoplastic resin (A) and the Resin (B) with a reactive functional group as shown in Table 4 was used, and that the cylinder temperature was adjusted to 320° C., the same melt-kneading procedure as in Example 1 was carried out. The flow effect pressure drop across the stretched flow zone, which is calculated by subtracting the pressure difference ($\Delta P_0$) in the stretched flow zone from the pressure difference ($\Delta P$) at the front side of the twist kneading disk, was 200 kg/cm$^2$.

Examples 19 to 25

Except that the Thermoplastic resin (A) and the Resin (B) with a reactive functional group as shown in Table 5 was used, the same melt-kneading procedure as in Example 1 was carried out. The flow effect pressure drop across the stretched flow zone, which is calculated by subtracting the pressure difference ($\Delta P_0$) in the stretched flow zone from the pressure difference ($\Delta P$) at the front side of the twist kneading disk, was 200 kg/cm$^2$.

Examples 26 and 27

Except that the Thermoplastic resin (A) and the Resin (B) with a reactive functional group as shown in Table 6 was used, and that the cylinder temperature was adjusted to 280° C., the same melt-kneading procedure as in Example 1 was carried out. The flow effect pressure drop across the stretched flow zone, which is calculated by subtracting the pressure difference ($\Delta P_0$) in the stretched flow zone from the pressure difference ($\Delta P$) at the front side of the twist kneading disk, was 200 kg/cm$^2$.

Example 28

Except that heat resistant agents (E-1: IR1098, Ciba Specialty Chemicals) (E-2: IR1010, Ciba Specialty Chemicals) as shown in Table 6 were used as Other additivess (E), the same melt-kneading procedure as in Example 1 was carried out.

Example 29

Except that heat resistant agents (E-1: IR1098, Ciba Specialty Chemicals) (E-2: IR1010, Ciba Specialty Chemicals) and a mold releasing agent (E-3: Licowax OP, Clariant Japan K.K.) as shown in Table 6 were used as Other additivess (E), the same melt-kneading procedure as in Example 1 was carried out.

Comparative Example 1

Except that ordinary kneading disks (L/D=4.0, 4.0, and 5.0) were provided from positions with a L/D ratio of 14, 23, and 30 (referred to as Screw constitution C-1), that the proportion (%) of the total length of the zone for performing melt-kneading in a stretched flow (stretched flow zone) to the overall length of the screws was adjusted to 0%, and that melt-kneading was performed without elongation in a stretched flow, the same melt-kneading procedure as in Example 1 was carried out. The flow effect pressure drop across the kneading zone, which is calculated by subtracting the pressure difference ($\Delta P_0$) in the kneading zone from the pressure difference ($\Delta P$) at the front side of the kneading disk, was less than 5 kg/cm$^2$.

Comparative Example 2

Except that ordinary kneading disks (L/D=3.8) were provided from positions with a L/D ratio of 22 and 28 (referred to as Screw constitution C-2), that the proportion (%) of the total length of the zone for performing melt-kneading in a stretched flow (stretched flow zone) to the overall length of the screws was adjusted to 0%, and that melt-kneading was performed without elongation in a stretched flow, the same melt-kneading procedure as in Example 5 was carried out. The flow effect pressure drop across the kneading zone, which is calculated by subtracting the pressure difference ($\Delta P_0$) in the kneading zone from the pressure difference ($\Delta P$) at the front side of the kneading disk, was less than 5 kg/cm².

Comparative Examples 3 and 4

Except that a Resin (C) having no reactive functional group was used as the Resin (B) with a reactive functional group as shown in Table 6, the same melt-kneading procedure as in Example 1 was carried out. The flow effect pressure drop across the stretched flow zone, which is calculated by subtracting the pressure difference ($\Delta P_0$) in the stretched flow zone from the pressure difference ($\Delta P$) at the front side of the twist kneading disk, was 200 kg/cm².

The strand-like melting resin discharged was allowed to pass through a cooling bath, and cut with a pelletizer while being taken up to produce a pellet sample. This sample was dried and processed under the following conditions to provide a test piece for evaluation, which subjected to evaluation for various characteristics.

(1) Impact Strength

An injection molding machine (SG75H-MIV, supplied by Sumitomo Heavy Industries, Ltd.) was used to prepare rectangle test pieces (10 mm width×80 mm length×4 mm thickness) under the conditions of an injection molding temperature of 260° C. (280° C. for Examples 10, 14 to 17, 27, and 28, and 320° C. for Example 18), mold temperature of 80° C., and injection pressure of 5 kgf/cm² above the lower limit pressure, followed by Charpy impact test at 23° C. and 50% RH according to ISO179 using a Charpy impact tester (611, supplied by Toyo Seiki Co., Ltd.).

(2) Deflection Temperature Under Load

An injection molding machine (SG75H-MIV, supplied by Sumitomo Heavy Industries, Ltd.) was used to prepare rectangle test pieces (10 mm width×80 mm length×4 mm thickness) under the conditions of an injection molding temperature of 260° C. (280° C. for Examples 10, 14 to 17, 27, and 28, and 320° C. for Example 18), die temperature of 80° C., and injection pressure of 5 kgf/cm² above the lower limit pressure, followed by moisture conditioning at 23° C. and 50% RH for 48 hours. For this sample, the deflection temperature under load (load: 0.45 MPa) was determined according to ISO75-1, 2.

(3) Tensile Test for Evaluation of Tensile Modulus and Tensile Breaking Elongation An injection molding machine (SG75H-MIV, supplied by Sumitomo Heavy Industries, Ltd.) was used to prepare JIS-5A dumbbell test pieces (75 mm length (effective measuring length 50 mm)×12.5 mm end width (effective measuring width 4 mm)×2 mm thickness) under the conditions of an injection molding temperature of 260° C. (280° C. for Examples 10, 14 to 17, 27, and 28, and 320° C. for Example 18), mold temperature of 80° C., and injection pressure of 5 kgf/cm² above the lower limit pressure, and subjected to tensile test with a tensile tester (Tensilon Tester UTA-2.5T, supplied by Orientec Co., Ltd.) under the conditions of a grip distance of 50 mm and tension speed of 100 mm/min, 500 mm/min, or 1,000 mm/min to make evaluations of the tensile modulus and tensile breaking elongation at these speeds. The tensile breaking elongation was determined from the rupture elongation for an effective measuring length of 50 mm.

Results of Examples 1 to 18 show that a thermoplastic resin composition with significantly-improved special viscoelasticity characteristics and a high impact absorbability can be produced when the Thermoplastic resin (A) and the Resin (B) with a reactive functional group are melt-kneaded in a stretched flow.

It is also shown that the thermoplastic resin compositions produced in Comparative examples 1 and 2 where a stretched flow zone is not provided or in Comparative examples 3 and 4 where a resin having no reactive functional group is used instead of the Resin (B) with a reactive functional group are inferior in impact resistance and heat resistance to those produced in Examples 19 to 29.

TABLE 1

|  |  |  |  |  | Example | | | |
|---|---|---|---|---|---|---|---|---|
|  |  |  |  |  | 1 | 2 | 3 | 4 |
| Compounding ratio | Polyamide resin (A) | A-1 | | Parts by weight | 70 | 70 | 70 | 70 |
|  |  | A-2 | | Parts by weight | | | | |
|  |  | A-3 | | Parts by weight | | | | |
|  | Resin (B) with a reactive functional group | B-1 | | Parts by weight | 30 | 30 | 30 | 30 |
|  |  | B-2 | | Parts by weight | | | | |
|  |  | B-3 | | Parts by weight | | | | |
| Melt-kneading | L/D of twin screw extruder | | | — | 45 | 45 | 35 | 35 |
|  | Screw constitution | | | — | A-1 | A-2 | B-1 | B-2 |
|  | Flow effect pressure drop | | | kg/cm² | 200 | 180 | 150 | 120 |
|  | Proportion of stretched flow zone | | | % | 29 | 20 | 31 | 23 |
|  | Largest Lk/D | | | — | 5 | 4 | 4 | 3 |
|  | Screw rotation speed | | | rpm | 300 | 300 | 300 | 300 |
|  | Extrusion output | | | kg/h | 20 | 20 | 20 | 20 |
|  | Extrusion output per 1 rpm | | | kg/h | 0.06 | 0.06 | 0.06 | 0.06 |
|  | Retention time | | | min | 3.5 | 3 | 1.5 | 1.2 |
| Performance of test piece | Tensile modulus | | 100/min | GPa | 1.5 | 1.5 | 1.4 | 1.4 |
|  |  | | 500 mm/minmm | GPa | 0.9 | 1.2 | 1.3 | 1.2 |
|  |  | | 1000 mm/min | GPa | 0.8 | 1.0 | 1.0 | 1.0 |
|  |  | | (1000 mm/min) − (100 mm/min) | GPa | −0.7 | −0.5 | −0.4 | −0.4 |

TABLE 1-continued

|  |  |  | Example | | | |
|---|---|---|---|---|---|---|
|  |  |  | 1 | 2 | 3 | 4 |
| Tensile breaking elongation | 100 mm/min | % | 130 | 143 | 148 | 145 |
|  | 500 mm/min | % | 156 | 158 | 152 | 152 |
|  | 1000 mm/min | % | 181 | 175 | 177 | 174 |
|  | (1000 mm/min) − (100 mm/min) | % | 51 | 32 | 29 | 29 |
| Impact strength |  | kJ/m² | 85 | 83 | 80 | 80 |
| Deflection temperature under load |  | °C. | 76 | 77 | 76 | 75 |

TABLE 2

|  |  |  |  | Example | | | | | Comparative example | |
|---|---|---|---|---|---|---|---|---|---|---|
|  |  |  |  | 5 | 6 | 7 | 8 | 9 | 1 | 2 |
| Compounding ratio | Polyamide resin (A) | A-1 | Parts by weight | 65 | 60 | 75 | 70 | 70 | 70 | 60 |
|  |  | A-2 | Parts by weight |  |  |  |  |  |  |  |
|  |  | A-3 | Parts by weight |  |  |  |  |  |  |  |
|  | Resin (B) with a reactive functional group | B-1 | Parts by weight | 35 | 40 | 25 | 30 | 30 | 30 | 40 |
|  |  | B-2 | Parts by weight |  |  |  |  |  |  |  |
|  |  | B-3 | Parts by weight |  |  |  |  |  |  |  |
| Melt-kneading | L/D of twin screw extruder |  | — | 45 | 45 | 45 | 45 | 45 | 45 | 45 |
|  | Screw constitution |  | — | A-1 | A-1 | A-1 | A-1 | A-1 | C-1 | C-2 |
|  | Flow effect pressure drop |  | kg/cm² | 200 | 200 | 200 | 200 | 200 | <5 | <5 |
|  | Proportion of stretched flow zone |  | % | 29 | 29 | 29 | 29 | 29 | 0 | 0 |
|  | Largest Lk/D |  | — | 5 | 5 | 5 | 5 | 5 | 0 | 0 |
|  | Screw rotation speed |  | rpm | 300 | 300 | 300 | 300 | 300 | 300 | 300 |
|  | Extrusion output |  | kg/h | 20 | 20 | 20 | 15 | 40 | 20 | 20 |
|  | Extrusion output per 1 rpm |  | kg/h | 0.06 | 0.06 | 0.06 | 0.05 | 0.13 | 0.06 | 0.06 |
|  | Retention time |  | min | 3.5 | 3.5 | 3.5 | 4.5 | 0.8 | 2 | 2 |
| Performance of test piece | Tensile modulus | 100 mm/min | GPa | 1.3 | 1.2 | 1.8 | 1.6 | 1.6 | 0.8 | 1.0 |
|  |  | 500 mm/min | GPa | 1.2 | 1.0 | 1.4 | 1.3 | 1.3 | 1.0 | 1.2 |
|  |  | 1000 mm/min | GPa | 0.9 | 0.8 | 1.1 | 1.0 | 1.0 | 1.3 | 1.3 |
|  |  | (1000 mm/min) − (100 mm/min) | GPa | −0.4 | −0.4 | −0.6 | −0.6 | −0.5 | 0.5 | 0.3 |
|  | Tensile breaking elongation | 100 mm/min | % | 136 | 108 | 158 | 144 | 145 | 80 | 121 |
|  |  | 500 mm/min | % | 149 | 118 | 168 | 156 | 157 | 73 | 113 |
|  |  | 1000 mm/min | % | 153 | 124 | 170 | 174 | 168 | 65 | 102 |
|  |  | (1000 mm/min) − (100 mm/min) | % | 17 | 16 | 12 | 30 | 23 | −15 | −19 |
|  | Impact strength |  | kJ/m² | 83 | 86 | 78 | 86 | 85 | 80 | 78 |
|  | Deflection temperature under load |  | °C. | 64 | 60 | 115 | 76 | 76 | 74 | 58 |

TABLE 3

|  |  |  |  | Example | | | |
|---|---|---|---|---|---|---|---|
|  |  |  |  | 10 | 11 | 12 | 13 |
| Compounding ratio | Polyamide resin (A) | A-1 | Parts by weight | 50 | 40 | 50 |  |
|  |  | A-2 | Parts by weight | 20 | 30 |  |  |
|  |  | A-3 | Parts by weight |  |  |  |  |
|  |  | A-4 | Parts by weight |  |  |  |  |
|  |  | A-5 | Parts by weight |  |  |  |  |
|  |  | A-6 | Parts by weight |  |  | 20 | 70 |
|  | Resin (B) with a reactive functional group | B-1 | Parts by weight | 30 | 30 | 30 | 30 |
|  |  | B-2 | Parts by weight |  |  |  |  |
|  |  | B-3 | Parts by weight |  |  |  |  |
| Melt-kneading | L/D of twin screw extruder |  | — | 45 | 45 | 45 | 45 |
|  | Screw constitution |  | — | A-1 | A-1 | A-1 | A-1 |
|  | Flow effect pressure drop |  | kg/cm² | 200 | 200 | 200 | 200 |
|  | Proportion of stretched flow zone |  | % | 29 | 29 | 29 | 29 |
|  | Largest Lk/D |  | — | 5 | 5 | 5 | 5 |
|  | Screw rotation speed |  | rpm | 300 | 300 | 300 | 300 |
|  | Extrusion output |  | kg/h | 20 | 20 | 20 | 20 |
|  | Extrusion output per 1 rpm |  | kg/h | 0.06 | 0.06 | 0.06 | 0.06 |
|  | Retention time |  | min | 3.5 | 3.5 | 3.5 | 3.5 |

TABLE 3-continued

|  |  |  |  | Example | | | |
|---|---|---|---|---|---|---|---|
|  |  |  |  | 10 | 11 | 12 | 13 |
| Performance of test piece | Tensile modulus | 100 mm/min | GPa | 1.5 | 1.4 | 1.4 | 1.4 |
|  |  | 500 mm/min | GPa | 1.3 | 1.3 | 1.2 | 1.2 |
|  |  | 1000 mm/min | GPa | 0.9 | 1.0 | 0.9 | 1.0 |
|  |  | (1000 mm/min) − (100 mm/min) | GPa | −0.7 | −0.4 | −0.4 | −0.4 |
|  | Tensile breaking elongation | 100 mm/min | % | 174 | 163 | 148 | 145 |
|  |  | 500 mm/min | % | 182 | 175 | 152 | 152 |
|  |  | 1000 mm/min | % | 189 | 183 | 177 | 174 |
|  |  | (1000 mm/min) − (100 mm/min) | % | 15 | 20 | 29 | 29 |
|  | Impact strength |  | kJ/m² | 85 | 83 | 80 | 80 |
|  | Deflection temperature under load |  | °C. | 76 | 77 | 76 | 75 |

TABLE 4

|  |  |  |  | Example | | | | |
|---|---|---|---|---|---|---|---|---|
|  |  |  |  | 14 | 15 | 16 | 17 | 18 |
| Compounding ratio | Polyamide resin (A) | A-1 | Parts by weight |  |  |  |  |  |
|  |  | A-2 | Parts by weight |  |  |  |  |  |
|  |  | A-3 | Parts by weight | 70 |  | 70 |  |  |
|  |  | A-4 | Parts by weight |  | 70 |  | 70 |  |
|  |  | A-5 | Parts by weight |  |  |  |  | 70 |
|  |  | A-6 | Parts by weight |  |  |  |  |  |
|  | Resin (B) with a reactive functional group | B-1 | Parts by weight | 30 | 30 |  |  | 30 |
|  |  | B-2 | Parts by weight |  |  | 30 | 30 |  |
|  |  | B-3 | Parts by weight |  |  |  |  |  |
| Melt-kneading | L/D of twin screw extruder |  | — | 45 | 45 | 45 | 45 | 45 |
|  | Screw constitution |  | — | A-1 | A-1 | A-1 | A-1 | A-1 |
|  | Flow effect pressure drop |  | kg/cm² | 200 | 200 | 200 | 200 | 200 |
|  | Proportion of stretched flow zone |  | % | 29 | 29 | 29 | 29 | 29 |
|  | Largest Lk/D |  | — | 5 | 5 | 5 | 5 | 5 |
|  | Screw rotation speed |  | rpm | 300 | 300 | 300 | 300 | 300 |
|  | Extrusion output |  | kg/h | 20 | 20 | 20 | 20 | 20 |
|  | Extrusion output per 1 rpm |  | kg/h | 0.06 | 0.06 | 0.06 | 0.06 | 0.06 |
|  | Retention time |  | min | 3.5 | 3.5 | 3.5 | 3.5 | 3.5 |
| Performance of test piece | Tensile modulus | 100 mm/min | GPa | 1.3 | 1.3 | 1.2 | 1.2 | 1.3 |
|  |  | 500 mm/min | GPa | 1.1 | 1.2 | 1.1 | 1.1 | 1.2 |
|  |  | 1000 mm/min | GPa | 0.9 | 0.9 | 0.9 | 0.9 | 0.9 |
|  |  | (1000 mm/min) − (100 mm/min) | GPa | −0.3 | −0.4 | −0.4 | −0.4 | −0.3 |
|  | Tensile breaking elongation | 100 mm/min | % | 120 | 191 | 173 | 156 | 112 |
|  |  | 500 mm/min | % | 137 | 201 | 180 | 162 | 118 |
|  |  | 1000 mm/min | % | 138 | 201 | 182 | 166 | 124 |
|  |  | (1000 mm/min) − (100 mm/min) | % | 18 | 10 | 9 | 10 | 12 |
|  | Impact strength |  | kJ/m² | 83 | 80 | 77 | 86 | 78 |
|  | Deflection temperature under load |  | °C. | 64 | 83 | 110 | 60 | 115 |

TABLE 5

|  |  |  |  | Example | | | | | | |
|---|---|---|---|---|---|---|---|---|---|---|
|  |  |  |  | 19 | 20 | 21 | 22 | 23 | 24 | 25 |
| Compounding ratio | Polyamide resin (A) | A-1 | Parts by weight | 70 | 70 | 70 | 70 | 70 | 70 | 70 |
|  |  | A-2 | Parts by weight |  |  |  |  |  |  |  |
|  |  | A-3 | Parts by weight |  |  |  |  |  |  |  |
|  | Resin (B) with a reactive functional group | B-1 | Parts by weight | 20 |  |  |  |  | 15 | 15 |
|  |  | B-2 | Parts by weight | 10 | 30 |  |  |  |  |  |
|  |  | B-3 | Parts by weight |  |  | 30 |  |  | 15 |  |
|  |  | B-4 | Parts by weight |  |  |  | 30 |  |  | 15 |
|  |  | B-5 | Parts by weight |  |  |  |  | 30 |  |  |
|  | Unmodified PE copolymer | C-1 | Parts by weight |  |  |  |  |  |  |  |
|  |  | C-2 | Parts by weight |  |  |  |  |  |  |  |

TABLE 5-continued

|  |  |  |  | Example |  |  |  |  |  |  |
|---|---|---|---|---|---|---|---|---|---|---|
|  |  |  |  | 19 | 20 | 21 | 22 | 23 | 24 | 25 |
|  | Other additives | E-1 | Parts by weight |  |  |  |  |  |  |  |
|  |  | E-2 | Parts by weight |  |  |  |  |  |  |  |
|  |  | E-3 | Parts by weight |  |  |  |  |  |  |  |
| Melt-kneading | L/D of twin screw extruder |  | — | 45 | 45 | 45 | 45 | 45 | 45 | 45 |
|  | Screw constitution |  | — | A-1 | A-1 | A-1 | A-1 | A-1 | A-1 | A-1 |
|  | Flow effect pressure drop |  | kg/cm² | 200 | 200 | 200 | 200 | 200 | 200 | 200 |
|  | Proportion of stretched flow zone |  | % | 29 | 29 | 29 | 29 | 29 | 29 | 29 |
|  | Largest Lk/D |  | — | 5 | 5 | 5 | 5 | 5 | 5 | 5 |
|  | Screw rotation speed |  | rpm | 300 | 300 | 300 | 300 | 300 | 300 | 300 |
|  | Extrusion output |  | kg/h | 20 | 20 | 20 | 20 | 20 | 20 | 20 |
|  | Extrusion output per 1 rpm |  | kg/h | 0.06 | 0.06 | 0.06 | 0.06 | 0.06 | 0.06 | 0.06 |
|  | Retention time |  | min | 3.5 | 3.5 | 3.5 | 3.5 | 3.5 | 3.5 | 3.5 |
| Performance of test piece | Tensile modulus | 100 mm/min | GPa | 1.3 | 1.2 | 1.4 | 1.4 | 1.3 | 1.4 | 1.3 |
|  |  | 500 mm/min | GPa | 1.2 | 1.2 | 1.2 | 1.2 | 1.1 | 1.2 | 1.2 |
|  |  | 1000 mm/min | GPa | 0.8 | 0.9 | 0.9 | 1.0 | 0.6 | 0.9 | 1.2 |
|  |  | (1000 mm/min) − (100 mm/min) | GPa | −0.5 | −0.3 | −0.4 | −0.4 | −0.7 | −0.5 | −0.2 |
|  | Tensile breaking elongation | 100 mm/min | % | 117 | 143 | 148 | 145 | 120 | 159 | 113 |
|  |  | 500 mm/min | % | 139 | 158 | 152 | 152 | 140 | 175 | 124 |
|  |  | 1000 mm/min | % | 181 | 172 | 177 | 174 | 160 | 179 | 127 |
|  |  | (1000 mm/min) − (100 mm/min) | % | 64 | 29 | 29 | 29 | 40 | 20 | 14 |
|  | Impact strength |  | kJ/m² | 85 | 83 | 80 | 80 | 83 | 78 | 86 |
|  | Deflection temperature under load |  | °C. | 76 | 77 | 76 | 75 | 64 | 115 | 76 |

TABLE 6

|  |  |  |  | Example |  |  |  | Comparative example |  |
|---|---|---|---|---|---|---|---|---|---|
|  |  |  |  | 26 | 27 | 28 | 29 | 3 | 4 |
| Compounding ratio | Polyamide resin (A) | A-1 | Parts by weight |  |  | 69 | 69 | 70 | 70 |
|  |  | A-2 | Parts by weight |  |  |  |  |  |  |
|  |  | A-3 | Parts by weight | 70 | 70 |  |  |  |  |
|  | Resin (B) with a reactive functional group | B-1 | Parts by weight |  |  | 30 | 30 |  |  |
|  |  | B-2 | Parts by weight |  |  |  |  |  |  |
|  |  | B-3 | Parts by weight |  |  |  |  |  |  |
|  |  | B-4 | Parts by weight | 30 |  |  |  |  |  |
|  |  | B-5 | Parts by weight |  | 30 |  |  |  |  |
|  | Unmodified PE copolymer | C-1 | Parts by weight |  |  |  |  | 30 |  |
|  |  | C-2 | Parts by weight |  |  |  |  |  | 30 |
|  | Other additives | E-1 | Parts by weight |  |  | 0.5 | 0.2 |  |  |
|  |  | E-2 | Parts by weight |  |  | 0.5 | 0.2 |  |  |
|  |  | E-3 | Parts by weight |  |  |  | 0.6 |  |  |
| Melt-kneading | L/D of twin screw extruder |  | — | 45 | 45 | 45 | 45 | 45 | 45 |
|  | Screw constitution |  | — | A-1 | A-1 | A-1 | A-1 | A-1 | A-1 |
|  | Flow effect pressure drop |  | kg/cm² | 200 | 200 | 200 | 200 | 200 | 200 |
|  | Proportion of stretched flow zone |  | % | 29 | 29 | 29 | 29 | 29 | 29 |
|  | Largest Lk/D |  | — | 5 | 5 | 5 | 5 | 5 | 5 |
|  | Screw rotation speed |  | rpm | 300 | 300 | 300 | 300 | 300 | 300 |
|  | Extrusion output |  | kg/h | 20 | 20 | 20 | 20 | 20 | 20 |
|  | Extrusion output per 1 rpm |  | kg/h | 0.06 | 0.06 | 0.06 | 0.06 | 0.06 | 0.06 |
|  | Retention time |  | min | 3.5 | 3.5 | 3.5 | 3.5 | 3.5 | 3 |
| Performance of test piece | Tensile modulus | 100 mm/min | GPa | 1.2 | 1.3 | 1.3 | 1.4 | 1.2 | 1.4 |
|  |  | 500 mm/min | GPa | 1.0 | 1.3 | 1.2 | 1.3 | 1.1 | 1.6 |
|  |  | 1000 mm/min | GPa | 0.9 | 0.8 | 0.9 | 1.0 | 0.5 | 1.7 |
|  |  | (1000 mm/min) − (100 mm/min) | GPa | −0.3 | −0.5 | −0.4 | −0.4 | −0.7 | 0.3 |
|  | Tensile breaking elongation | 100 mm/min | % | 138 | 142 | 113 | 147 | 112 | 30 |
|  |  | 500 mm/min | % | 172 | 165 | 130 | 175 | 125 | 28 |
|  |  | 1000 mm/min | % | 186 | 177 | 161 | 181 | 151 | 25 |
|  |  | (1000 mm/min) − (100 mm/min) | % | 48 | 35 | 48 | 34 | 39 | −5 |
|  | Impact strength |  | kJ/m² | 85 | 83 | 79 | 82 | 86 | 67 |
|  | Deflection temperature under load |  | °C. | 76 | 74 | 78 | 75 | 60 | 56 |

Example 30

A polybutylene terephthalate resin used as Thermoplastic resin (A) and a glycidyl methacrylate-modified polyethylene copolymer used as Resin (B) with a reactive functional group were mixed at a compounding ratio as shown in Table 7. While removing volatile matter with a vacuum pump and supplying a nitrogen flow, the mixture was melt-kneaded in a co-rotating, fully intermeshing twin screw extruder with a screw diameter of 37 mm and a L/D ratio of 40 (TEM-37 with two double-thread screws, supplied by Toshiba Machine Co.) at a cylinder temperature of 260° C. and at a screw rotation rate and extrusion output as shown in Table 7, and discharged from the discharge port. A coloring agent was added to the starting materials and the time at which the degree of coloring of the extrudate reached a maximum was measured to determine the retention time as shown in Table 7. The proportion (%) of the total length of the zone for performing melt-kneading in a stretched flow (stretched flow zone) to the overall length of the screws, defined as (total length of stretched flow zone)/(overall length of screws)×100, was adjusted to 19%. The extruder had a twist kneading disk comprising screws with Lk/D ratios of 3.8 and 3.8 from the positions at which the L/D ratio was 22 and 28, respectively, and the spiral angle θ between the apex of the front end of the kneading disk and the apex of its rear end was 20° in the caracole direction of the screws (referred to as Screw constitution A-1). The flow effect pressure drop across the stretched flow zone, which is calculated by subtracting the pressure difference ($\Delta P_0$) in the stretched flow zone from the pressure difference ($\Delta P$) at the front side of the twist kneading disk, was 200 kg/cm$^2$.

Example 31

Except that the extruder used had a twist kneading disk comprising screws with Lk/D ratios of 3.8 from the positions at which the L/D ratio was 28, respectively, and the spiral angle θ between the apex of the front end of the kneading disk and the apex of its rear end was 20° in the caracole direction of the screws (referred to as Screw constitution A-2) and that the proportion (%) of the total length of the zone for performing melt-kneading in a stretched flow (stretched flow zone) to the overall length of the screws adjusted to 9.5%, the same melt-kneading procedure as in Example 30 was carried out. The flow effect pressure drop across the stretched flow zone, which is calculated by subtracting the pressure difference ($\Delta P_0$) in the stretched flow zone from the pressure difference ($\Delta P$) at the front side of the twist kneading disk, was 200 kg/cm$^2$.

Example 32

In the screw constitution here (referred to as Screw constitution B), a resin passage with a cross section decreasing from the front end toward the rear end of the screw (clearance decreasing down to 3.5 mm or 1 mm) was provided in the flighted portions of the flighted screws for which the Lk/D ratio was 3.8 and 3.8 from positions with a L/D ratio of 22 and 28, respectively, and the proportion (%) of the total length of the zone for performing melt-kneading in a stretched flow (stretched flow zone) to the overall length of the screws was adjusted to 19%. Otherwise the same melt-kneading procedure as in Example 30 was carried out. The flow effect pressure drop across the stretched flow zone, which is calculated by subtracting the pressure difference ($\Delta P_0$) in the stretched flow zone from the pressure difference ($\Delta P$) at the front side of the twist kneading disk, was 150 kg/cm$^2$.

Example 33

Except that polyphenylene sulfide resin was used as Thermoplastic resin (A) and that the cylinder temperature was adjusted to 310° C., the same melt-kneading procedure as in Example 30 was carried out.

Example 34 to 40

Except that the Thermoplastic resin (A) and the Resin (B) with a reactive functional group were as shown in Table 8 and that the cylinder temperature was 220° C. only in Example 38, the same melt-kneading procedure as in Example 30 was carried out. The flow effect pressure drop across the stretched flow zone, which is calculated by subtracting the pressure difference ($\Delta P_0$) in the stretched flow zone from the pressure difference ($\Delta P$) at the front side of the twist kneading disk, was 200 kg/cm$^2$.

Comparative Example 5

Except that ordinary kneading disks (L/D=3.8) were provided from positions with a L/D ratio of 22 and 28 (referred to as Screw constitution C), that the proportion (%) of the total length of the zone for performing melt-kneading in a stretched flow (stretched flow zone) to the overall length of the screws was adjusted to 0%, and that melt-kneading was performed without elongation in a stretched flow, the same melt-kneading procedure as in Example 30 was carried out. The flow effect pressure drop across the kneading zone, which is calculated by subtracting the pressure difference ($\Delta P_0$) in the kneading zone from the pressure difference ($\Delta P$) at the front side of the kneading disk, was less than 5 kg/cm$^2$.

Comparative Example 6

Except that an unmodified polyethylene having no reactive functional group was used as the Resin (B) with a reactive functional group, the same melt-kneading procedure as in Example 30 was carried out. The flow effect pressure drop across the stretched flow zone, which is calculated by subtracting the pressure difference ($\Delta P_0$) in the stretched flow zone from the pressure difference ($\Delta P$) at the front side of the twist kneading disk, was 200 kg/cm$^2$.

Comparative Example 7

Except that ordinary kneading disks (L/D=3.8) were provided from positions with a L/D ratio of 22 and 28 (referred to as Screw constitution C), that the proportion (%) of the total length of the zone for performing melt-kneading in a stretched flow (stretched flow zone) to the overall length of the screws was adjusted to 0%, and that melt-kneading was performed without elongation in a stretched flow, the same melt-kneading procedure as in Example 33 was carried out. The flow effect pressure drop across the kneading zone, which is calculated by subtracting the pressure difference ($\Delta P_0$) in the kneading zone from the pressure difference ($\Delta P$) at the front side of the kneading disk, was less than 5 kg/cm$^2$.

Comparative Example 8 to 14

Except the Thermoplastic resin (A) and the Resin (B) with a reactive functional group were as shown in Table 10, that the cylinder temperature was 220° C. only in Comparative example 12, that ordinary kneading disks (L/D=3.8) were provided from positions with a L/D ratio of 22 and 28 (referred to as Screw constitution C), that the proportion (%) of the total length of the zone for performing melt-kneading in a stretched flow (stretched flow zone) to the overall length of the screws was adjusted to 0%, and that melt-kneading was performed without elongation in a stretched flow, the same melt-kneading procedure as in Examples 34-40 was carried out. The flow effect pressure drop across the kneading zone, which is calculated by subtracting the pressure difference ($\Delta P_0$) in the kneading zone from the pressure difference ($\Delta P$) at the front side of the kneading disk, was less than 5 kg/cm².

The strand-like melting resin discharged was allowed to pass through a cooling bath, and cut with a pelletizer while being taken up to produce a pellet sample. This sample was dried and processed under the following conditions to provide a test piece for evaluation, which subjected to evaluation for various characteristics.

(1) Impact Strength

An injection molding machine (NP7-1F, supplied by Nissei Plastic Industrial Co., Ltd.) was used to prepare rectangle test pieces (10 mm width×80 mm length×4 mm thickness) under the conditions of an injection molding temperature of 260° C. (310° C. for Example 33 and Comparative example 7), mold temperature of 80° C. (130° C. for Example 33 and Comparative example 7), and injection pressure of 5 kgf/cm² above the lower limit pressure, followed by Charpy impact test at 23° C. and 50% RH according to ISO179 using a Charpy impact tester (611, supplied by Toyo Seiki Co., Ltd.).

(2) Deflection Temperature Under Load

An injection molding machine (NP7-1F, supplied by S Nissei Plastic Industrial Co., Ltd.) was used to prepare rectangle test pieces (10 mm width×80 mm length×4 mm thickness) under the conditions of an injection molding temperature of 260° C. (310° C. for Example 33 and Comparative example 7), mold temperature of 80° C. (130° C. for Example 33 and Comparative example 7), and injection pressure of 5 kgf/cm² above the lower limit pressure, followed by moisture conditioning at 23° C. and 50% RH for 48 hours. For this sample, the deflection temperature under load (load: 0.45 MPa) was determined according to ISO75-1, 2.

(3) Tensile Test for Evaluation of Tensile Modulus and Tensile Breaking Elongation An injection molding machine (NP7-1F, supplied by Nissei Plastic Industrial Co., Ltd.) was used to prepare JIS-5A dumbbell test pieces (75 mm length (effective measuring length 50 mm)×12.5 mm end width (effective measuring width 4 mm)×2 mm thickness) under the conditions of an injection molding temperature of 260° C., mold temperature of 80° C., and injection pressure of 5 kgf/cm² above the lower limit pressure, and subjected to tensile test with a tensile tester (Tensilon Tester UTA-2.5T, supplied by Orientec Co., Ltd.) under the conditions of a grip distance of 50 mm and tension speed of 100 mm/min, 500 mm/min, or 1,000 mm/min to make evaluations of the tensile modulus and tensile breaking elongation at these speeds. The tensile breaking elongation was determined from the rupture elongation for an effective measuring length of 50 mm.

Results of Examples 34, and 36 to 40 show that a thermoplastic resin composition with a high impact and heat resistance, significantly-improved special viscoclasticity characteristics, and a high impact absorbability can be produced when the Thermoplastic resin (A) and the Resin (B) with a reactive functional group are melt-kneaded in a stretched flow.

It is also shown that the thermoplastic resin compositions produced in Comparative examples 8, and 10 to 14 where a stretched flow zone is not provided are inferior in impact resistance and heat resistance and fail to develop special viscoelasticity characteristics as compared with Examples 34, and 36 to 40.

TABLE 7

| | | | | | Example | | | |
|---|---|---|---|---|---|---|---|---|
| | | | | | 30 | 31 | 32 | 33 |
| Compounding ratio | Thermoplastic resin (A) | A-7 | Parts by weight | | 80 | 80 | 80 | |
| | | A-8 | Parts by weight | | | | | 80 |
| | | A-1 | Parts by weight | | | | | |
| | | A-9 | Parts by weight | | | | | |
| | | A-10 | Parts by weight | | | | | |
| | | A-11 | Parts by weight | | | | | |
| | | A-12 | Parts by weight | | | | | |
| | | A-13 | Parts by weight | | | | | |
| | Resin (B) with a reactive | B-1 | Parts by weight | | 20 | 20 | 20 | 20 |
| | functional group | B-2 | Parts by weight | | | | | |
| | | B-5 | Parts by weight | | | | | |
| | Others | C-2 | Parts by weight | | | | | |
| Melt-kneading | L/D of twin screw extruder | | — | | 40 | 40 | 40 | 40 |
| | Screw constitution | | — | | A-1 | A-2 | B | A-1 |
| | Flow effect pressure drop | | kg/cm² | | 200 | 200 | 150 | 200 |
| | Proportion of stretched flow zone | | % | | 19 | 9.5 | 19 | 19 |
| | Lk/D | | — | | 3.8 | 3.8 | 3.8 | 3.8 |
| | Screw rotation speed | | rpm | | 300 | 300 | 300 | 300 |
| | Extrusion output | | kg/h | | 20 | 20 | 20 | 20 |
| | Extrusion output per 1 rpm | | kg/h | | 0.06 | 0.06 | 0.06 | 0.06 |
| | Retention time | | min | | 3 | 3 | 3.5 | 3.5 |
| Characteristics | Impact strength | | kJ/m² | | 75 | 70 | 74 | 60 |
| | Deflection temperature under load (1.80 MPa) | | ° C. | | 55 | 53 | 55 | 105 |

TABLE 8

| | | | | Example | | | | | | |
|---|---|---|---|---|---|---|---|---|---|---|
| | | | | 34 | 35 | 36 | 37 | 38 | 39 | 40 |
| Compounding ratio | Thermoplastic resin (A) | A-7 | Parts by weight | | | | | | | |
| | | A-8 | Parts by weight | 75 | | | | | | |
| | | A-1 | Parts by weight | | 80 | | | | | |
| | | A-9 | Parts by weight | | | 75 | | | | |
| | | A-10 | Parts by weight | | | | 75 | | | |
| | | A-11 | Parts by weight | | | | | 75 | | |
| | | A-12 | Parts by weight | | | | | | 75 | |
| | | A-13 | Parts by weight | | | | | | | 75 |
| | Resin (B) with a reactive functional group | B-1 | Parts by weight | | | | | | | |
| | | B-2 | Parts by weight | 25 | | 25 | 25 | 25 | 25 | 25 |
| | | B-5 | Parts by weight | | 20 | | | | | |
| | Other | C-2 | Parts by weight | | | | | | | |
| Melt-kneading | L/D of twin screw extruder | | — | 40 | 40 | 40 | 40 | 40 | 40 | 40 |
| | Screw constitution | | — | A-1 | A-1 | A-1 | A-1 | A-1 | A-1 | A-1 |
| | Flow effect pressure drop | | kg/cm$^2$ | 200 | 200 | 200 | 200 | 200 | 200 | 200 |
| | Proportion of stretched flow zone | | % | 19 | 19 | 19 | 19 | 19 | 19 | 19 |
| | Lk/D | | — | 3.8 | 3.8 | 3.8 | 3.8 | 3.8 | 3.8 | 3.8 |
| | Screw rotation speed | | rpm | 300 | 300 | 300 | 300 | 300 | 300 | 300 |
| | Extrusion output | | kg/h | 20 | 20 | 20 | 20 | 20 | 20 | 20 |
| | Extrusion output per 1 rpm | | kg/h | 0.06 | 0.06 | 0.06 | 0.06 | 0.06 | 0.06 | 0.06 |
| | Retention time | | min | 3 | 3 | 3 | 3 | 3 | 3 | 3 |
| Characteristics | Tensile modulus | 100 mm/min | GPa | 1.4 | — | 1.0 | 1.3 | 1.8 | 1.5 | 0.9 |
| | | 500 mm/min | GPa | 1.2 | — | 0.7 | 1.2 | 1.7 | 1.4 | 0.8 |
| | | 1000 mm/min | GPa | 0.9 | — | 0.6 | 1.1 | 1.5 | 1.2 | 0.7 |
| | | (1000 mm/min) − (100 mm/min) | GPa | −0.5 | — | −0.4 | −0.2 | −0.3 | −0.3 | −0.2 |
| | Tensile breaking elongation | 100 mm/min | % | 122 | — | 100 | 77 | 60 | 63 | 101 |
| | | 500 mm/min | % | 137 | — | 120 | 87 | 72 | 70 | 113 |
| | | 1000 mm/min | % | 147 | — | 121 | 92 | 75 | 80 | 120 |
| | | (1000 mm/min) − (100 mm/min) | % | 25 | — | 21 | 15 | 15 | 17 | 19 |
| | Impact strength | | kJ/m$^2$ | 75 | 30 | 72 | 50 | 65 | 40 | 60 |
| | Deflection temperature under load (1.80 MPa) | | °C. | 100 | 55 | 70 | 94 | 50 | 180 | 52 |

TABLE 9

| | | | | Comparative example | | |
|---|---|---|---|---|---|---|
| | | | | 5 | 6 | 7 |
| Compounding ratio | Thermoplastic resin (A) | A-7 | Parts by weight | 80 | 80 | |
| | | A-8 | Parts by weight | | | 80 |
| | | A-1 | Parts by weight | | | |
| | | A-9 | Parts by weight | | | |
| | | A-10 | Parts by weight | | | |
| | | A-11 | Parts by weight | | | |
| | | A-12 | Parts by weight | | | |
| | | A-13 | Parts by weight | | | |
| | Resin (B) with a reactive functional group | B-1 | Parts by weight | 20 | | 20 |
| | | B-2 | Parts by weight | | | |
| | | B-5 | Parts by weight | | | |
| | Others | C-2 | Parts by weight | | 20 | |
| Melt-kneading | L/D of twin screw extruder | | — | 40 | 40 | 40 |
| | Screw constitution | | — | C | A-1 | C |
| | Flow effect pressure drop | | kg/cm$^2$ | <5 | 200 | <5 |
| | Proportion of stretched flow zone | | % | 0 | 19 | 0 |
| | Lk/D | | — | 0 | 3.8 | 0 |
| | Screw rotation speed | | rpm | 300 | 300 | 300 |
| | Extrusion output | | kg/h | 20 | 20 | 20 |
| | Extrusion output per 1 rpm | | kg/h | 0.06 | 0.06 | 0.06 |
| | Retention time | | min | 2 | 3 | 2 |
| Characteristics | Impact strength | | kJ/m$^2$ | 40 | 35 | 43 |
| | Deflection temperature under load (1.80 MPa) | | °C. | 48 | 46 | 95 |

TABLE 10

|  |  |  |  | Comparative example | | | | | | |
|---|---|---|---|---|---|---|---|---|---|---|
|  |  |  |  | 8 | 9 | 10 | 11 | 12 | 13 | 14 |
| Compounding ratio | Thermoplastic resin (A) | A-7 | Parts by weight |  |  |  |  |  |  |  |
|  |  | A-8 | Parts by weight | 75 |  |  |  |  |  |  |
|  |  | A-1 | Parts by weight |  | 80 |  |  |  |  |  |
|  |  | A-9 | Parts by weight |  |  | 75 |  |  |  |  |
|  |  | A-10 | Parts by weight |  |  |  | 75 |  |  |  |
|  |  | A-11 | Parts by weight |  |  |  |  | 75 |  |  |
|  |  | A-12 | Parts by weight |  |  |  |  |  | 75 |  |
|  |  | A-13 | Parts by weight |  |  |  |  |  |  | 75 |
|  | Resin (B) with a reactive functional group | B-1 | Parts by weight |  |  |  |  |  |  |  |
|  |  | B-2 | Parts by weight | 25 |  | 25 | 25 | 25 | 25 | 25 |
|  |  | B-5 | Parts by weight |  | 20 |  |  |  |  |  |
|  | Others | C-2 | Parts by weight |  |  |  |  |  |  |  |
| Melt-kneading | L/D of twin screw extruder |  | — | 40 | 40 | 40 | 40 | 40 | 40 | 40 |
|  | Screw constitution |  | — | C | C | C | C | C | C | C |
|  | Flow effect pressure drop |  | kg/cm$^2$ | <5 | <5 | <5 | <5 | <5 | <5 | <5 |
|  | Proportion of stretched flow zone |  | % | 0 | 0 | 0 | 0 | 0 | 0 | 0 |
|  | Lk/D |  | — | 0 | 0 | 0 | 0 | 0 | 0 | 0 |
|  | Screw rotation speed |  | rpm | 300 | 300 | 300 | 300 | 300 | 300 | 300 |
|  | Extrusion output |  | kg/h | 20 | 20 | 20 | 20 | 20 | 20 | 20 |
|  | Extrusion output per 1 rpm |  | kg/h | 0.06 | 0.06 | 0.06 | 0.06 | 0.06 | 0.06 | 0.06 |
|  | Retention time |  | min | 2 | 2 | 2 | 2 | 2 | 2 | 2 |
| Characteristics | Tensile modulus | 100 mm/min | GPa | 1.4 | — | 1.0 | 1.3 | 1.8 | 1.5 | 1.0 |
|  |  | 500 mm/min | GPa | 1.5 | — | 1.1 | 1.3 | 1.9 | 1.6 | 1.0 |
|  |  | 1000 mm/min | GPa | 1.4 | — | 1.1 | 1.4 | 2.0 | 1.6 | 1.2 |
|  |  | (1000 mm/min) − (100 mm/min) | GPa | 0 | — | 0.1 | 0.1 | 0.2 | 0.1 | 0.2 |
|  | Tensile breaking elongation | 100 mm/min | % | 100 | — | 96 | 70 | 60 | 59 | 98 |
|  |  | 500 mm/min | % | 97 | — | 93 | 65 | 55 | 55 | 90 |
|  |  | 1000 mm/min | % | 89 | — | 88 | 61 | 50 | 49 | 85 |
|  |  | (1000 mm/min) − (100 mm/min) | % | −11 | — | −8 | −9 | −10 | −10 | −13 |
|  | Impact strength |  | kJ/m$^2$ | 52 | 15 | 49 | 29 | 35 | 26 | 38 |
|  | Deflection temperature under load (1.80 MPa) |  | °C. | 89 | 52 | 65 | 85 | 48 | 173 | 50 |

Example 41

A polyamide resin used as Thermoplastic resin (A), a polyphenylene ether resin used as Thermoplastic resin (C), and a styrene-maleic anhydride copolymer used as Compound (D) with a reactive functional group were mixed at a compounding ratio as shown in Table 11. While removing volatile matter with a vacuum pump and supplying a nitrogen flow, the mixture was melt-kneaded in a co-rotating, fully intermeshing twin screw extruder with a screw diameter of 37 mm and a L/D ratio of 40 (TEM-37 with two double-thread screws, supplied by Toshiba Machine Co.) at a cylinder temperature of 290° C. and at a screw rotation rate and extrusion output as shown in Table 11, and discharged from the discharge port. A coloring agent was added to the starting materials and the time at which the degree of coloring of the extrudate reached a maximum was measured to determine the retention time as shown in Table 11. The proportion (%) of the total length of the zone for performing melt-kneading in a stretched flow (stretched flow zone) to the overall length of the screws, defined as (total length of stretched flow zone)/(overall length of screws)×100, was adjusted to 19%. The extruder had a twist kneading disk comprising screws with Lk/D ratios of 3.8 and 3.8 from the positions at which the L/D ratio was 22 and 28, respectively, and the spiral angle θ between the apex of the front end of the kneading disk and the apex of its rear end was 20° in the caracole direction of the screws (referred to as Screw constitution A-1). The flow effect pressure drop across the stretched flow zone, which is calculated by subtracting the pressure difference ($\Delta P_0$) in the stretched flow zone from the pressure difference ($\Delta P$) at the front side of the twist kneading disk, was 200 kg/cm$^2$.

Example 42

Except that the extruder used had a twist kneading disk comprising screws with Lk/D ratios of 3.8 from the positions at which the L/D ratio was 28, respectively, and the spiral angle θ between the apex of the front end of the kneading disk and the apex of its rear end was 20° in the caracole direction of the screws (referred to as Screw constitution A-2) and that the proportion (%) of the total length of the zone for performing melt-kneading in a stretched flow (stretched flow zone) to the overall length of the screws adjusted to 9.5%, the same melt-kneading procedure as in Example 41 was carried out. The flow effect pressure drop across the stretched flow zone, which is calculated by subtracting the pressure difference ($\Delta P_0$) in the stretched flow zone from the pressure difference ($\Delta P$) at the front side of the twist kneading disk, was 200 kg/cm$^2$.

Example 43

In the screw constitution here (referred to as Screw constitution B), a resin passage with a cross section decreasing from the front end toward the rear end of the screw (clearance decreasing down to 3.5 mm or 1 mm) was provided in the flighted portions of the flighted screws for which the Lk/D ratio was 3.8 and 3.8 from positions with a L/D ratio of 22 and 28, respectively, and the proportion (%) of the total length of the zone for performing melt-kneading in a stretched flow (stretched flow zone) to the overall length of the screws was adjusted to 19%. Otherwise the same melt-kneading procedure as in Example 41 was carried out. The flow effect pressure drop across the stretched flow zone, which is calculated by subtracting the pressure difference ($\Delta P_0$) in the stretched flow zone from the pressure difference (ΔP) at the front side of the twist kneading disk, was 150 kg/cm².

Comparative Example 15

While removing volatile matter with a vacuum pump and supplying a nitrogen flow, the mixture was melt-kneaded in a co-rotating, fully intermeshing twin screw extruder with a screw diameter of 37 mm and a L/D ratio of 100 (TEM-37BS-26/2V with two double-thread screws, supplied by Toshiba Machine Co.) at a cylinder temperature of 290° C. and at a screw rotation rate and extrusion output as shown in Table 11, and discharged from the discharge port. A coloring agent was added to the starting materials and the time at which the degree of coloring of the extrudate reached a maximum was measured to determine the retention time as shown in Table 11. The proportion (%) of the total length of the kneading disk (shearing zone, kneading zone) to the overall length of the screws, defined as (total length of kneading zone)/(overall length of screws)×100, was adjusted to 16%. The extruder had a shearing zone (kneading zone) comprising screws with Lk/D ratios of 1.8, 1.8, 2.3, 2.3, 2.3, 2.3, and 3.0 from the positions at which the L/D ratio was 22, 28, 43, 55, 69, 77, and 93, respectively, (referred to as Screw constitution D). The proportion (%) of the total length of the zone for performing melt-kneading in a stretched flow (stretched flow zone) to the overall length of the screws was adjusted to 0%, and melt-kneading was performed without elongation in a stretched flow. Otherwise the same melt-kneading procedure as in Examples 41 was carried out. The flow effect pressure drop across the kneading zone, which is calculated by subtracting the pressure difference (ΔP$_0$) in the kneading zone from the pressure difference (ΔP) at the front side of the kneading disk, was less than 5 kg/cm².

The strand-like melting resin discharged was allowed to pass through a cooling bath, and cut with a pelletizer while being taken up to produce a pellet sample. This sample was dried and processed under the following conditions to provide a test piece for evaluation, which subjected to evaluation for various characteristics.

(1) Impact Strength

An injection molding machine (NP7-1F, supplied by Nissei Plastic Industrial Co., Ltd.) was used to prepare rectangle test pieces (10 mm width×80 mm length×4 mm thickness) under the conditions of an injection molding temperature of 290° C., mold temperature of 80° C., and injection pressure of 5 kgf/cm² above the lower limit pressure, followed by Charpy impact test at 23° C. and 50% RH according to ISO179 using a Charpy impact tester (611, supplied by Toyo Seiki Co., Ltd.).

(2) Deflection Temperature Under Load

An injection molding machine (NP7-1F, supplied by S Nissei Plastic Industrial Co., Ltd.) was used to prepare rectangle test pieces (10 mm width×80 mm length×4 mm thickness) under the conditions of an injection molding temperature of 290° C., mold temperature of 80° C., and injection pressure of 5 kgf/cm² above the lower limit pressure, followed by moisture conditioning at 23° C. and 50% RH for 48 hours. For this sample, the deflection temperature under load (load: 1.80 MPa) was determined according to ISO75-1, 2.

Results of Examples 41 to 43 show that a thermoplastic resin composition with a high impact and heat resistance can be produced when the Thermoplastic resin (A), Thermoplastic resin (C), and Compound (D) with a reactive functional group are melt-kneaded in a stretched flow.

Results above show that the products produced through melt-kneading in a stretched flow are high in impact resistance and heat resistance as compared with those produced through a process without a stretched flow zone and with a increased L/D ratio of 100.

TABLE 11

|  |  |  |  | | Example | | | Comparative example |
|---|---|---|---|---|---|---|---|---|
|  |  |  |  |  | 41 | 42 | 43 | 15 |
| Compounding ratio | Thermoplastic resin (A) | A-1 | Parts by weight | | 50 | 50 | 50 | 50 |
|  | Thermoplastic resin (C) | C-3 | Parts by weight | | 50 | 50 | 50 | 50 |
|  | Compound (D) with a reactive functional group | D-1 | Parts by weight | | 1 | 1 | 1 | 1 |
| Melt-kneading | L/D of twin screw extruder |  |  | — | 40 | 40 | 40 | 100 |
|  | Screw constitution |  |  | — | A-1 | A-2 | B | D |
|  | Flow effect pressure drop |  |  | kg/cm² | 200 | 200 | 150 | <5 |
|  | Proportion of stretched flow zone |  |  | % | 19 | 9.5 | 19 | 0 |
|  | Lk/D |  |  | — | 3.8 | 3.8 | 3.8 |  |
|  | Screw rotation speed |  |  | rpm | 100 | 100 | 100 | 50 |
|  | Extrusion output |  |  | kg/h | 10 | 10 | 10 | 5 |
|  | Extrusion output per 1 rpm |  |  | kg/h | 0.1 | 0.1 | 0.1 | 0.1 |
|  | Retention time |  |  | min | 6 | 6 | 6 | 18 |
| Characteristics | Impact strength |  |  | kJ/m² | 12 | 10 | 11 | 4 |
|  | Deflection temperature under load (1.80 MPa) |  |  | ° C. | 117 | 115 | 117 | 110 |

INDUSTRIAL APPLICABILITY

The present invention makes it possible to produce a thermoplastic resin composition having characteristics (heat resistance, impact resistance, etc., in good balance) unable to be achieved with the conventional production methods wherein the material is stretched in a flow and simultaneously melt-kneaded during reactive processing to produce a thermoplastic resin composition comprising a compound containing a reactive functional group, and also makes it possible to produce a thermoplastic resin composition having peculiar viscoelastic characteristics prominently characterized in that the elastic modulus decreases for an increased flexibility with an increasing deformation speed and also having impact absorbing characteristics characterized in that even when suffering a heavy, high-speed impact, the large energy is absorbed, causing only a limited maximum load on other adjacent members to avoid their destruction.

The invention claimed is:

1. A thermoplastic resin composition production method wherein melt-kneading is carried out in an extruder in which the flow effect pressure drop across the zone for performing melt-kneading in a stretched flow (stretched flow zone) is 100 to 1,000 kg/cm² when producing a thermoplastic resin composition as specified in paragraph (I) or (II) below:

(I) a thermoplastic resin composition comprising a Thermoplastic resin (A) and a Rubber-like polymer (B) with a reactive functional group (II) a thermoplastic resin composition comprising a Thermoplastic resin (A), a Thermoplastic resin (C) that is different from the Thermoplastic resin (A), and a Compound (D) with a reactive functional group.

2. A thermoplastic resin composition production method as claimed in claim 1 wherein in the thermoplastic resin composition production process, melt-kneading is carried out in an extruder in which the proportion of the total length of the zone for performing melt-kneading in a stretched flow to the total screw length of the extruder is in the range of 5 to 60%.

3. A thermoplastic resin composition production method as claimed in claim 2 wherein the length Lk of one segment of the zone for performing melt-kneading in a stretched flow (stretched flow zone) and the screw diameter D meet the equation:

Lk/D=0.2 to 10.

4. A thermoplastic resin composition production method as claimed in claim 1 wherein the Thermoplastic resin (A) is at least one selected from the following: polyamide resin, polyester resin, polyphenylene sulfide resin, polyacetal resin, styrene-based resin, polyphenylene oxide resin, polycarbonate resin, polylactic acid resin, and polypropylene resin.

5. A thermoplastic resin composition production method as claimed in claim 1 wherein the Thermoplastic resin (C) is at least one selected from the following and different from the Thermoplastic resin (A): polyamide resin, polyester resin, polyphenylene sulfide resin, polyacetal resin, styrene-based resin, polyphenylene oxide resin, polycarbonate resin, polylactic acid resin, and polypropylene resin.

6. A thermoplastic resin composition production method as claimed in claim 1 wherein the reactive functional group in the Rubber-like polymer (B) with a reactive functional group is at least one selected from the following: amino group, carboxyl group, carboxyl metal salt, epoxy group, acid anhydride group, and oxazoline group.

7. A thermoplastic resin composition production method as claimed in claim 1 wherein the reactive functional group in the Compound (D) with a reactive functional group is at least one selected from the following: amino group, carboxyl group, carboxyl metal salt, epoxy group, acid anhydride group, and oxazoline group.

8. A thermoplastic resin composition production method as claimed in claim 1 wherein the Thermoplastic resin (A) is polyamide resin.

9. A thermoplastic resin composition production method as claimed in claim 1 wherein the thermoplastic resin composition under tensile test meets the following equation: $E(V_1) > E(V_2)$ if $V_1 < V_2$, where $E(V_1)$ and $E(V_2)$ represent the tensile modulus at a tension speed of $V_1$ and $V_2$, respectively.

10. A thermoplastic resin composition production method as claimed in claim 1 wherein the thermoplastic resin composition under tensile test meets the following equation: $\epsilon(V_1) < \epsilon(V_2)$ if $V_1 < V_2$, where $\epsilon(V_1)$ and $\epsilon(V_2)$ represent the tensile breaking elongation at a tension speed of $V_1$ and $V_2$, respectively.

11. A thermoplastic resin composition production method as claimed in claim 6, wherein the rubber-like polymer (B) is a member selected from the group consisting of: polybutadiene; polyisoprene; copolymers of styrene and butadiene; hydrogenated block copolymers of styrene and butadiene; diene-type rubbers; copolymers of ethylene and propylene; copolymers of ethylene and butane; copolymers of ethylene and α-olefin; ethylene-unsaturated carboxylate copolymers; copolymers of acrylate and butadiene; acrylate-based elastic polymers; copolymers of ethylene and aliphatic vinyl groups; ethylene-propylene-unconjugated diene terpolymers; thermoplastic butylene-isoprene copolymer elastomers; thermoplastic chlorinated polyethylenes; thermoplastic polyamide elastomers; and thermoplastic polyester elastomers.

* * * * *